(12) United States Patent
Yashiki et al.

(10) Patent No.: US 10,261,224 B2
(45) Date of Patent: Apr. 16, 2019

(54) OPTICAL ELEMENT

(71) Applicant: TOPPAN PRINTING CO., LTD., Taito-ku, Tokyo (JP)

(72) Inventors: Kazuhiro Yashiki, Tokyo (JP); Akira Kubo, Tokyo (JP); Chikara Sawamura, Tokyo (JP); Haruna Ooki, Tokyo (JP)

(73) Assignee: Toppan Printing Co., Ltd., Taito-ku, Tokyo (JP)

( * ) Notice: Subject to any disclaimer, the term of this patent is extended or adjusted under 35 U.S.C. 154(b) by 164 days.

(21) Appl. No.: 15/368,289

(22) Filed: Dec. 2, 2016

(65) Prior Publication Data

US 2017/0082787 A1 Mar. 23, 2017

Related U.S. Application Data

(63) Continuation of application No. PCT/JP2015/066585, filed on Jun. 9, 2015.

(30) Foreign Application Priority Data

Jun. 9, 2014 (JP) .................................. 2014-118985

(51) Int. Cl.
*G02B 5/02* (2006.01)
*G02B 5/08* (2006.01)
(Continued)

(52) U.S. Cl.
CPC .......... *G02B 5/1866* (2013.01); *B42D 25/328* (2014.10); *G02B 5/0221* (2013.01);
(Continued)

(58) Field of Classification Search
CPC .............. G02B 27/4211; G02B 5/1814; G02B 5/1895; G02B 27/0037; G02B 27/4277;
(Continued)

(56) References Cited

U.S. PATENT DOCUMENTS

2008/0304004 A1* 12/2008 Amako ................ B32B 38/145
349/201
2015/0070775 A1 3/2015 Yashiki

FOREIGN PATENT DOCUMENTS

| EP | 2 857 872 | 4/2015 |
| JP | 2003-255115 A | 9/2003 |
| WO | WO 2013/180231 | 12/2013 |

OTHER PUBLICATIONS

International Preliminary Report on Patentability dated Dec. 15, 2016 in International Patent Application No. PCT/JP2015/066585, 4 pages.

(Continued)

*Primary Examiner* — Evan P Dzierzynski
*Assistant Examiner* — Sharrief I Broome
(74) *Attorney, Agent, or Firm* — Squire Patton Boggs (US) LLP

(57) ABSTRACT

An optical element includes a transmission diffraction portion, which reflective portions and transmissive portions. The reflective portions are arranged at equal intervals along a given axis. Each reflective portion reflects light included in the visible light. The light reflected by the reflective portions forms a reflection image. The transmissive portions transmit the visible light. Each transmissive portion is sandwiched by two corresponding reflective portions that are adjacent to each other along the given axis. At least part of each reflective portion forms the reflection image by rendering a reflection angle of the light reflected by the reflective portions different from an angle of light incident on the reflective portions. The transmission diffraction portion forms diffracted images having different colors with diffracted light that is produced by diffracting light transmitted through the transmissive portions in a predetermined direction.

15 Claims, 19 Drawing Sheets

(51) Int. Cl.
*G02B 5/18* (2006.01)
*B42D 25/328* (2014.01)
(52) U.S. Cl.
CPC ............... *G02B 5/08* (2013.01); *G02B 5/18* (2013.01); *G02B 5/1814* (2013.01); *G02B 2005/1804* (2013.01)
(58) Field of Classification Search
CPC .... G02B 5/1866; G02B 5/1861; G02B 13/18; G02B 27/42; G02B 5/1857; G02B 5/1871; G02B 5/1876; G02B 13/0055; G02B 27/4216; G02B 5/18; G02B 5/1842
See application file for complete search history.

(56) References Cited

OTHER PUBLICATIONS

Extended European Search Report dated Oct. 10, 2017, in European Patent Application No. 15806682.9, 6 pages.

* cited by examiner

OPTICAL ELEMENT

BACKGROUND

The present invention relates to an optical element.

Articles that need to be protected against forgery, such as securities, certificates, and upscale brand name products, are known to have optical elements that prevent forgery of the articles. Such optical elements provide optical effects that are difficult to reproduce. Examples of such optical elements include holograms, diffraction gratings, and multilayer interference films. These optical elements have minute structures or complex layered structures, which hinder analysis of the structures of the optical elements. This prevents counterfeiting of the optical elements, thereby limiting forgery of the articles with such optical elements.

An optical element such as a hologram includes a reflection layer, which is in contact with a diffraction structure to enhance the optical effect of the element. In such a structure, the difficulty in reproducing the hologram can be increased by shaping the reflection layer in a predetermined pattern (see Japanese Laid-Open Patent Publication No. 2003-255115 for example).

In order to increase the difficulty in reproducing the optical effects of optical elements, it is desirable that a single optical element provide additional optical effects. Addition of optical effects to an optical element has been desired not only for an optical element that is used to prevent forgery of articles described above, but also for an optical element that is attached to an article for decoration and an optical element that is appreciated for its own aesthetic quality.

SUMMARY

It is an objective of the present invention to provide an optical element that provides additional optical effects.

To achieve the foregoing objective and in accordance with one aspect of the present invention, an optical element that includes a transmission diffraction portion is provided. The transmission diffraction portion includes a plurality of reflective portions and a plurality of transmissive portions. The reflective portions are arranged at equal intervals along a given axis. Each of the reflective portions reflects light included in visible light, and the light reflected by the reflective portions forms a reflection image. The transmissive portions are each sandwiched by two corresponding reflective portions that are adjacent to each other along the given axis. The transmissive portions transmit the visible light. At least part of each reflective portion forms the reflection image by rendering a reflection angle of the light reflected by the reflective portions different from an angle of light incident on the reflective portions. The transmission diffraction portion forms a plurality of diffraction images having different colors with diffraction light that is produced by diffracting light transmitted through the transmissive portions in a predetermined direction.

With the above described aspect of the optical element, a single optical element provides images that are formed by the transmitted light and have different colors, in addition to a reflection image formed by the reflection light. In other words, additional optical effects are added to the single optical element.

DESCRIPTION OF EXEMPLARY EMBODIMENTS

[First Embodiment]

Referring to FIGS. 1 to 10, an optical element according to a first embodiment will now be described. In the following descriptions, the structure of the optical element, the operation of the optical element, and a method for manufacturing the optical element are described in this order.

[Structure of Optical Element]

Figure 1:
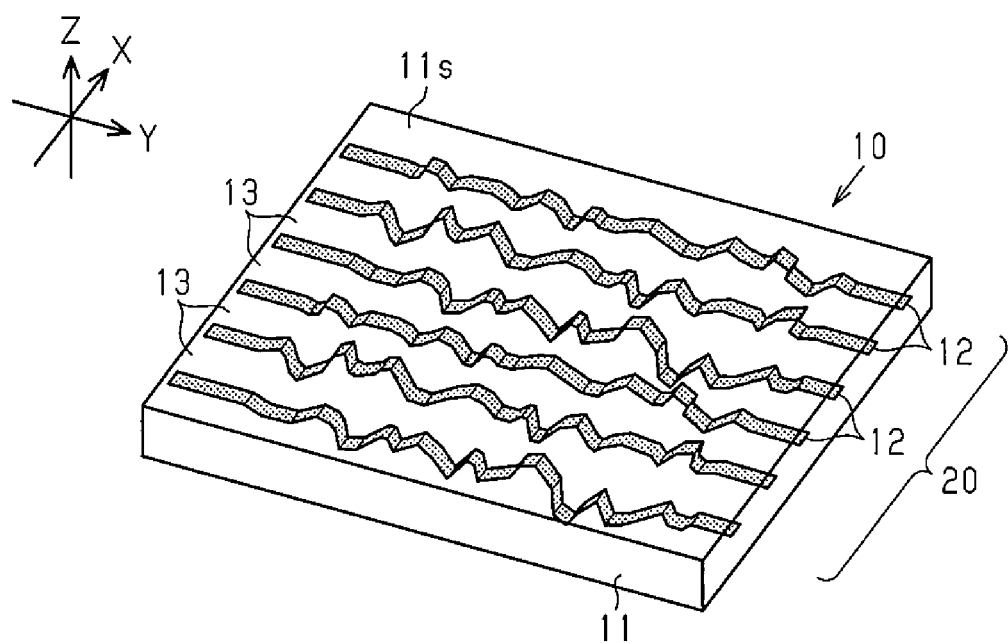
FIG. 1 is a perspective view showing the structure of an optical element according to a first embodiment of the present invention.
Figure 2:
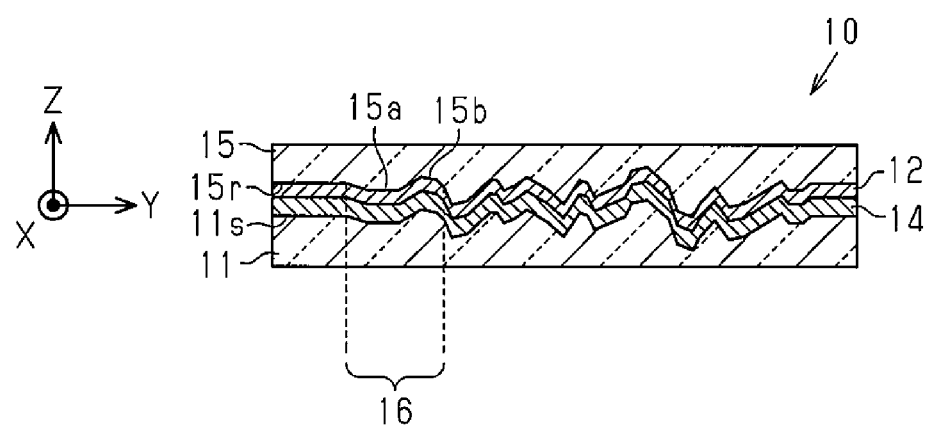
FIG. 2 is a cross-sectional view showing the cross-sectional structure in a Z-Y plane of the optical element of the first embodiment.
Figure 3:
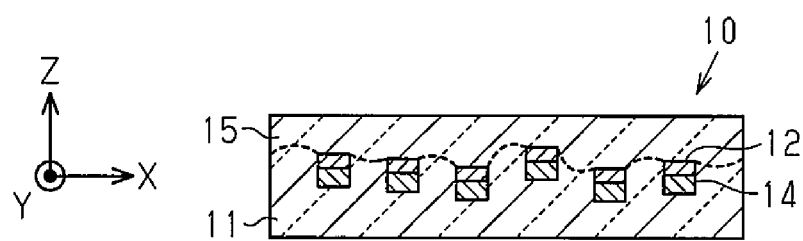
FIG. 3 is a cross-sectional view showing the cross-sectional structure in a Z-X plane of the optical element of the first embodiment.
Figure 4:
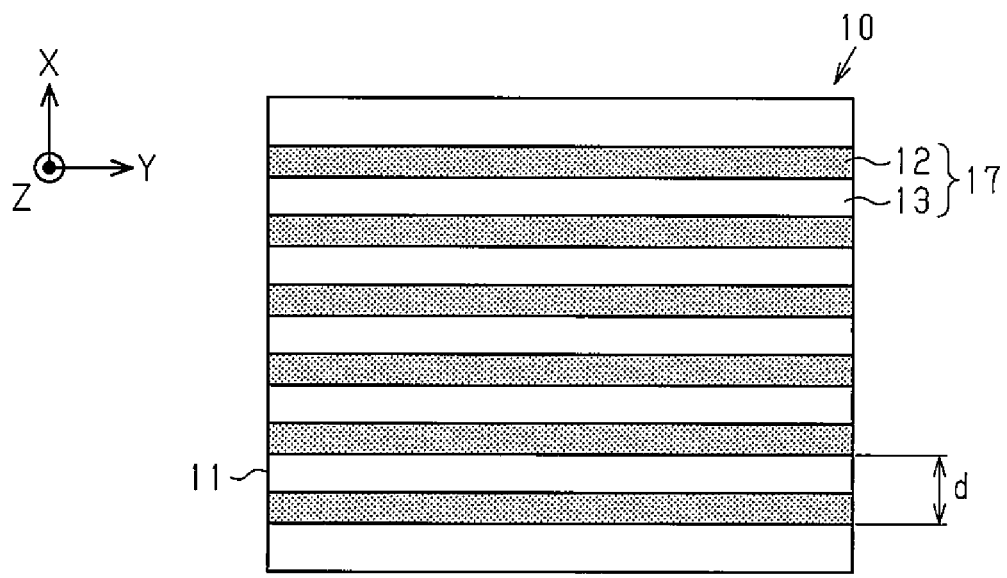
FIG. 4 is a plan view showing the planar structure of the optical element according to the first embodiment as viewed along the Z axis.

Referring to FIGS. 1 to 4, the structure of the optical element will now be described. In FIGS. 1 and 4, an upper transparent plastic layer, which is formed on reflective portions of the optical element, is not shown for the sake of convenience in explanation of the structure of the optical element. In addition, to clarify the positions of the reflective portions relative to the lower transparent plastic layer, the reflective portions are shaded with dots in FIGS. 1 and 4. Further, the uneven structure formed in the surface of the lower transparent plastic layer is not shown in FIG. 1 for illustrative purposes.

As shown in FIG. 1, an optical element 10 includes an upper transparent plastic layer, a lower transparent plastic layer 11, a surface 11s, which is a surface of the lower transparent plastic layer 11, and a plurality of reflective portions 12, which is formed between the upper transparent plastic layer and the lower transparent plastic layer 11. The optical element 10 includes a plurality of transmissive portions 13. Each transmissive portion 13 includes a first section, which is a section of the upper transparent plastic layer that is sandwiched by two reflective portions 12, and a second section, which is a section of the lower transparent plastic layer 11 that is sandwiched by two reflective portions 12. The second section faces the first section. The optical element 10 includes a transmission diffraction portion 20, which is formed by the reflective portions 12 and the transmissive portions 13.

The reflective portions 12 reflect visible light and reflect at least part of wavelengths of between 400 nm and 700 nm inclusive. The transmittance of the reflective portions 12 is preferably less than 30%. The transmissive portions 13 transmit at least part of wavelengths of between 400 nm and 700 nm inclusive, and the transmittance of the transmissive portions 13 is preferably 70% or more.

The reflective portions 12 may be made of a metal such as Al, Sn, Cr, Ni, Cu, Au, and Ag or a compound, such as oxide, of a metal selected from this group of metals. Of the materials listed above, the reflective portions 12 are preferably made of a material the reflectance and transparency of which change when the material dissolves or corrodes or when the properties of the material are changed, for example. Further, two or more materials in the group of metals and the group of metal compounds listed above may be used.

To change the reflectance or transmittance of the reflective portions 12 by dissolving the material, the material selected from the group of metals and the group of metal oxides listed above may be etched. The etching process may use an agent, such as acid, alkali, organic solvent, oxidant, and reducing agent.

To change the reflectance or transmittance of the reflective portions 12 by changing the properties of the material, copper may be oxidized by an oxidant and changed to cuprous oxide, or aluminum may be oxidized by an oxidant and changed to boehmite, for example.

The reflective portions 12 may be made of a material selected from the group of metals and the group of metal compounds listed above. In addition, the selected material may be subject to the processing described above. The material and processing may be selected according to the optical properties needed for the optical element 10 and the durability in use such as weather resistance and adhesion between layers.

The thin film that forms the reflective portions 12 preferably has a uniform surface density. Thus, the thin film that forms the reflective portions 12 is preferably formed through a dry coating method. The dry coating method may be vacuum deposition, sputtering, or CVD, for example.

The material of the reflective portions 12 is not limited to the materials having a metallic luster or a predetermined color described above and may be a transparent material. Transparent materials are listed below. The example of the material for the reflective portions 12 include $Sb_2O_3$, $Fe_2O_3$, $TiO_2$, CdS, $CeO_2$, ZnS, $PbCl_2$, CdO, $Sb_2O_3$, $WO_3$, SiO, $Si_2O_3$, $In_2O_3$, PbO, $Ta_2O_3$, ZnO, $ZrO_2$, MgO, $SiO_2$, $Si_2O_2$, $MgF_2$, $CeF_3$, $CaF_2$, $AlF_3$, $Al_2O_3$, and GaO.

The transparent material of the reflective portions 12 may be an organic polymer. The examples of organic polymer that may be used to form the reflective portions 12 include polyethylene, polypropylene, polytetrafluoroethylene, polymethyl methacrylate, and polystyrene.

Further, the reflective portions 12 may be made of reflective inks in which high-refractive-index resin or high-refractive-index filler is dispersed. The material of the reflective portions 12 may be selected from the materials listed above according to the reflectance property or durability required for the optical element 10.

The transmissive portions 13, that is, the upper transparent plastic layer and the lower transparent plastic layer 11 forming the transmissive portions 13, may be made of various resins that satisfy the transmittance described above. For example, thermosetting resin and ultraviolet curable resin may be used. As long as the transmittance described above is satisfied, the upper transparent plastic layer and the lower transparent plastic layer 11 may have matte finish or may be white.

The lower transparent plastic layer 11 may have the shape of a rectangular plate that extends two-dimensionally along the X axis, which is an example of a given axis, and the Y axis extending perpendicular to the X axis. Each of the reflective portions 12 is shaped like a strip extending along the Y axis, which serves as a given axis. The reflective portions 12 are arranged at equal intervals along the X axis. In the similar manner as the reflective portions 12, each of the transmissive portions 13 is shaped like a strip extending along the Y axis. The transmissive portions 13 are arranged at equal intervals along the X axis.

As shown in FIG. 2, the optical element 10 further includes a plurality of protection portions 14, each located between the surface 11s of the lower transparent plastic layer 11 and a corresponding reflective portion 12. In the similar manner as the reflective portions 12, each of the protection portions 14 is shaped like a strip extending along the Y axis. The protection portions 14 are arranged at equal intervals along the X axis. The entire area of each protection portion 14 overlaps the entire area of the corresponding reflective portion 12 as viewed along the Z axis. The protection portions 14 protect the reflective portions 12 from wear and corrosion that would otherwise be caused by agents during manufacturing of the optical element 10.

Thus, the wear resistance and resistance to agents of the protection portions 14 are preferably higher than those of the reflective portions 12. However, even if the wear resistance and resistance to agents of the protection portions 14 are lower than those of the reflective portions 12, the protection portions 14, which cover one surface of respective reflective portions 12, still protect the reflective portions 12.

The protection portions 14 may function as the etching mask used when the reflective portions 12 are formed by etching process. When the protection portions 14 function as the etching mask, it is preferable that the protection portions 14 be not dissolved by at least one liquid that dissolves the reflective portions 12, or that the speed at which the liquid dissolves the protection portions 14 be less than the speed at which the liquid dissolves the reflective portions 12.

As is the case with the reflective portions 12, the thin film for forming the protection portions 14 preferably has a uniform surface density. The thin film for forming the protection portions 14 may be formed by a dry coating method such as vacuum deposition, CVD, and sputtering. Such methods allow for adjustment of the thickness of the thin film for the protection portions 14, the film formation speed, the number of layers, and the optical thickness of the film. Of the dry coating methods listed above, the vacuum deposition allows the material used to travel from the vapor source to the substrate in straight lines. Thus, the vacuum deposition is preferably selected as the dry coating method.

The protection portions 14 may be made of any material that can be applied by a dry coating method. For example, one or more materials selected from the group of metals and the group of metal compounds listed above in relation to the reflective portions 12 may be used to form the protection portions 14.

As is the case with the reflective portions 12, the protection portions 14 may be made of a transparent material. The examples of the transparent material for the protection portions 14 include $Sb_2O_3$, $Fe_2O_3$, $Fe_3O_4$, $TiO_2$, $Ti_2O_3$, CdS, $CeO_2$, ZnS, $PbCl_2$, CdO, $Sb_2O_3$, $WO_3$, SiO, $Si_2O_3$, $In_2O_3$, PbO, $Ta_2O_3$, ZnO, $ZrO_2$, MgO, $SiO_2$, $Si_2O_2$, $MgF_2$, $CeF_3$, $CaF_2$, $AlF_3$, $Al_2O_3$, and GaO.

The transparent material for forming the protection portions 14 may be an organic polymer. The examples of organic polymers for forming the protection portions 14 include polyethylene, polypropylene, polytetrafluoroethylene, polymethyl methacrylate, and polystyrene.

When the protection portions 14 function as an etching mask, the protection portions 14 may be formed in a predetermined pattern by photolithography. In this case, a negative or positive resist is applied to the thin film for forming the protection portions 14, and the resist is then exposed to a pattern of light. Then, the thin film for forming the protection portions 14 is etched using the resist as an etching mask. This forms the protection portions 14, which function as an etching mask, on part of the thin film for forming the reflective portions 12. Then, the thin film for forming the reflective portions 12 is etched using the protection portions 14 as the etching mask, thereby forming the reflective portions 12.

As described above, the optical element 10 includes the upper transparent plastic layer 15, which covers the reflective portions 12. The upper transparent plastic layer 15 protects the transmission diffraction portion 20 from friction and moisture.

The upper transparent plastic layer 15 includes a back surface 15r, which faces the lower transparent plastic layer 11. The back surface 15r includes projections 15a and depressions 15b that are arranged alternately along the Y axis. In this description, the projections 15a are the sections that project toward the lower transparent plastic layer 11 along the Z axis, and the depressions 15b are the sections that project toward the surface of the upper transparent plastic layer 15. A depression 15b and a projection 15a that are adjacent to each other along the Y axis form one reflection unit portion 16. The reflection unit portions 16 have different lengths along the Y axis. That is, the back surface 15r of the upper transparent plastic layer 15 has a non-periodic uneven structure formed by the depressions 15b and projections 15a.

The depressions 15b include depressions 15b that differ from one another in the position of their bottom portions on the Z axis. The projections 15a include projections 15a that differ from one another in the position of their top portions on the Z axis. Each of the depressions 15b and projections 15a extends along the X axis in the back surface 15r.

Each protection portion 14 has an uneven structure that conforms to the uneven structure of the section of the back surface 15r of the upper transparent plastic layer 15 that corresponds to the protection portion 14. Each reflective portion 12 has an uneven structure that conforms to the uneven structure of the section of the back surface 15r of the upper transparent plastic layer 15 that corresponds to the reflective portion 12.

As such, each protection portion 14 has a non-periodic uneven structure that is equivalent to that of the back surface 15r as described above, and each reflective portion 12 has a non-periodic uneven structure that is equivalent to that of the back surface 15r as described above. As a result, the light that is incident on the reflective portions 12 through the upper transparent plastic layer 15 is scattered by the reflective portions 12. The reflective portions 12 produce scattered light as reflection light, and the scattered light forms a reflection image. That is, the reflective portions 12 form the reflection image by rendering the reflection angle of light reflected by the reflective portions 12 different from the angle of light incident on the reflective portions 12.

The uneven structure of each reflective portion 12 substantially extends over the entire length along the Y axis of the reflective portion 12. However, it is sufficient that at least part of each reflective portion 12 on the Y axis have the uneven structure.

FIG. 3 shows a cross-sectional shape of the optical element 10 in a Z-X plane. As described above, the depressions 15b formed in the back surface 15r include depressions 15b that differ from one another in the position of their bottom portions on the Z axis. The projections 15a include projections 15a that differ from one another in the position of their top portions on the Z axis. Thus, when one protection portion 14 and one reflective portion 12 that are layered form one lamination structure, a plurality of lamination structures may include lamination structures that differ from one another in position on the Z axis. In addition, the lamination structures may include lamination structures that are identical in position on the Z axis.

As shown in FIG. 4, the reflective portions 12 are arranged at equal intervals along the X axis, and the transmissive portions 13 are arranged at equal intervals along the X axis. A reflective portion 12 and a transmissive portion 13 that are adjacent to each other along the X axis form one transmission periodic portion 17. The width of the transmission periodic portion 17 along the X axis is a grating period d.

When the grating period d is greater than 0.20 μm and less than or equal to 20 μm, the transmission diffraction portion 20 forms a plurality of diffraction images with diffraction light that is produced by diffracting the light transmitted through the transmissive portions 13 in a predetermined direction, and the diffraction images differ from one another in color. To form vivid diffraction images by the transmission diffraction portion 20, the grating period d is preferably 0.35 μm or more. To obtain a desirable viewing angle of the diffraction images, that is, the angle of dispersion of the diffraction images, in terms of the visual recognition of the images by an observer, the grating period d is preferably between 0.5 μm and 10 μm inclusive. A grating period d of more than 20 μm reduces the viewing angle of the diffraction images and narrows the range of angles at which the observer can perceive the images.

When a transmissive diffraction grating has a grating period d that is less than the wavelengths of light in the visible light region, such a diffraction grating is referred to as a subwavelength grating. The subwavelength grating absorbs wavelengths in a specific region, reflects wavelengths in a specific region, and separates polarized light from the incident light. In order for the subwavelength grating to separate polarized light from light in the visible light region, light of 400 to 700 nm for example, the grating period d of the subwavelength grating preferably has a length of 0.15 μm or more and less than 0.35 μm, which is less than half the length of the visible light wavelength. More preferably, the grating period d is between 0.15 μm and 0.30 μm inclusive.

When the grating period d is greater than 0.20 μm and less than 0.35 μm, the transmission diffraction portion 20 diffracts visible light and transmits only the polarized light that is the component perpendicular to the reflective portions 12.

[Operation of Optical Element]

Figure 5:
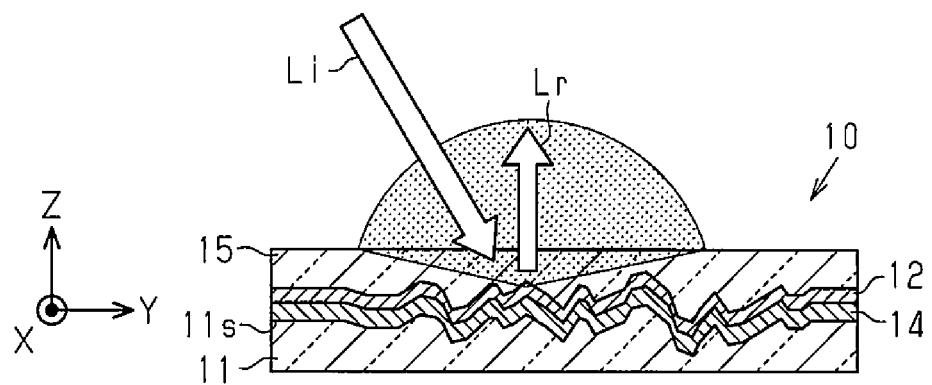
FIG. 5 is an operation diagram showing the optical effect of reflection of the light incident on the optical element of the first embodiment.
Figure 6:
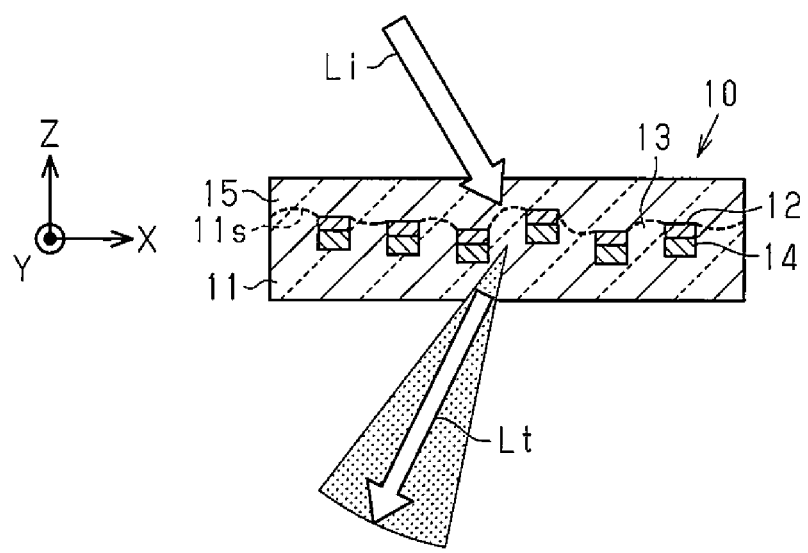
FIG. 6 is an operation diagram showing the optical effect of transmission of the light incident on the optical element of the first embodiment.

Referring to FIGS. 5 and 6, the operation of the optical element will now be described.

As shown in FIG. 5, when light is incident on the reflective portions 12 of the optical element 10 through the upper transparent plastic layer 15, the reflective portions 12, each having a non-periodic uneven structure, reflect incident light Li in various directions. In other words, the reflection light Lr produced by the reflective portions 12 is scattered light. As such, when the incident light Li is white visible light, the optical element 10 reflects white scattered light.

As shown in FIG. 6, when light is incident on the reflective portions 12 of the optical element 10 through the upper transparent plastic layer 15, the incident light Li passes through the transmissive portions 13 and emanates from the back surface of the lower transparent plastic layer 11, which is opposite to the surface 11s, as transmitted light Lt. Here, the transmission diffraction portion 20 diffracts light rays of different wavelengths in the incident light Li at transmission angles that vary depending on light ray and forms diffraction images that differ from one another in color.

Consequently, in reflected light observation in which an observer of the optical element 10 faces the upper transparent plastic layer 15 of the optical element 10 from above, the observer observes white scattered light that is scattered by the reflective portions 12. In contrast, in transmitted light observation in which an observer of the optical element 10 faces the lower transparent plastic layer 11 of the optical element 10 from above with light from a light source behind the optical element 10 being transmitted through the optical element 10, the observer observes iridescent diffraction light that is diffracted by the transmission diffraction portion 20.

[Method for Manufacturing Optical Element]

Referring to FIGS. 7 to 10, the method for manufacturing the optical element will now be described.

Manufacturing of the optical element 10 starts with formation of an original plate of the upper transparent plastic layer 15, which has non-periodic uneven structures. The original plate is formed by photolithography using an electron-beam lithography system. In the sections of the original plate that correspond to the sections of the upper transparent plastic layer 15 where the reflective portions 12 are located, a non-periodic uneven structure is formed that has a smaller specific surface area, that is, a smaller aspect ratio. In the sections of the original plate that correspond to the sections of the upper transparent plastic layer 15 where the reflective portions 12 are not located, an uneven structure is formed that has a larger specific surface area, that is, a larger aspect ratio, than the non-periodic uneven structure for scattering light.

Figure 7:
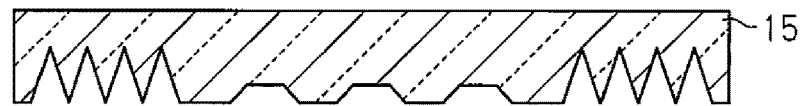
FIG. 7 is a process view showing a step in a method for manufacturing the optical element of the first embodiment.

As shown in FIG. 7, the uneven structure in the surface of the original plate is replicated to form the upper transparent plastic layer 15 having the non-periodic uneven structure. The upper transparent plastic layer 15 may be formed by a photopolymer method, for example. That is, to form the upper transparent plastic layer 15, an ultraviolet curable resin is applied to the original plate and then radiated with ultraviolet rays to be cured. Then, the cured ultraviolet curable resin is peeled off, thereby forming the upper transparent plastic layer 15 with the non-periodic uneven structure.

The method for forming the upper transparent plastic layer 15 is not limited to the photopolymer method described above and may be other methods such as heat embossing, hot/cold press method, photopolymer method, and nanoimprint method.

Figure 8:
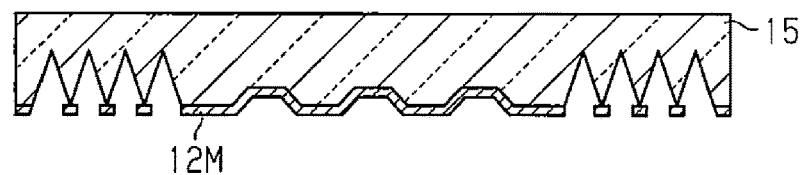
FIG. 8 is a process view showing a step in the method for manufacturing the optical element of the first embodiment.

As shown in FIG. 8, a metal film, such as an aluminum film 12M, is vacuum-deposited onto the entire surface of the upper transparent plastic layer 15 that has the uneven structure. In the surface of the upper transparent plastic layer 15 having the uneven structure, the section with the smaller aspect ratio is covered by the aluminum film 12M of a predetermined thickness, whereas the section with the larger aspect ratio receives only a small amount of aluminum film 12M. Moreover, on the section of the upper transparent plastic layer 15 having the larger aspect ratio, the aluminum film 12M is formed linearly along a given axis or islanded on the surface of the upper transparent plastic layer 15.

The dry coating method for forming the aluminum film 12M is not limited to vacuum deposition, and any of the dry coating methods listed above may be used.

Figure 9:
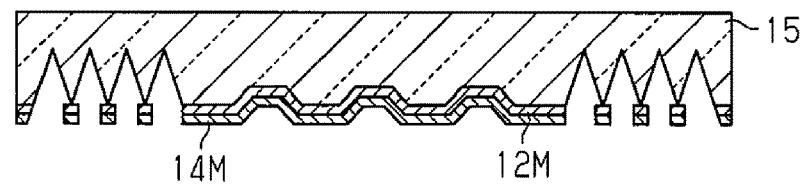
FIG. 9 is a process view showing a step in the method for manufacturing the optical element of the first embodiment.

As shown in FIG. 9, magnesium fluoride is vacuum-deposited onto the entire surface of the aluminum film 12M to protect the aluminum film 12M. As is the case with the aluminum film 12M, the section of the upper transparent plastic layer 15 that has the smaller aspect ratio is covered by a magnesium fluoride film 14M for forming the protection portions 14, whereas the magnesium fluoride film 14M is scarcely formed on the section that has the larger aspect ratio. Moreover, on the section of the upper transparent plastic layer 15 that has the larger aspect ratio, the magnesium fluoride film 14M is formed linearly along a given axis or islanded on the surface of the upper transparent plastic layer 15.

The dry coating method for forming the magnesium fluoride film 14M is not limited to vacuum deposition, and any of the dry coating methods listed above may be used.

The aluminum film 12M is dissolved by an alkaline solution, allowing for etching using the alkaline solution. In contrast, the magnesium fluoride film 14M is not dissolved by the alkaline solution. Thus, the magnesium fluoride film 14M can serve as a mask when wet-etching the aluminum film 12M using the alkaline solution.

Figure 10:
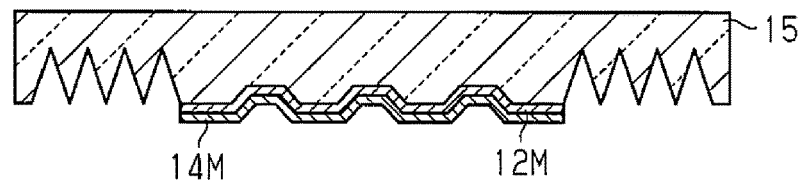
FIG. 10 is a process view showing a step in the method for manufacturing the optical element of the first embodiment.

Referring to FIG. 10, the upper transparent plastic layer 15 on which the aluminum film 12M and the magnesium fluoride film 14M are formed is immersed in the alkaline solution. Consequently, in the linear or islanded lamination structure of aluminum film 12M and magnesium fluoride film 14M, the aluminum film 12M is brought into contact with the alkaline solution and thus alkaline etched. In the section of the upper transparent plastic layer 15 that has the smaller aspect ratio, the aluminum film 12M is protected by the magnesium fluoride film 14M. Thus, the aluminum film 12M is not etched in the etching process using the alkaline solution.

This manufacturing method allows the magnesium fluoride film 14M to protect only the section of aluminum film 12M corresponding to the reflective portions 12, without the need for forming the magnesium fluoride film 14M into a pattern to protect the aluminum film 12M. Accordingly, such a manufacturing method allows reflective portions 12 of high resolution to be formed in desired positions by adjusting the aspect ratios of the uneven structures in the surface of the original plate used to form the upper transparent plastic layer 15.

In the manufacturing method described above, the thickness of the magnesium fluoride film 14M forming the protection portions 14, that is, the thickness along the Z axis, is preferably not more than half the thickness of the aluminum film 12M forming the reflective portions 12. For example, when the thickness of the aluminum film 12M is between 5 nm and 500 nm inclusive, the thickness of the magnesium fluoride film 14M is preferably between 0.3 nm and 200 nm inclusive and not more than half the thickness of the aluminum film 12M.

On the section of the surface of the upper transparent plastic layer 15 from which the aluminum film 12M needs to be removed, that is, the section including the transmissive portions 13 of the optical element 10, a significantly thin magnesium fluoride film 14M is formed on a significantly thin aluminum film 12M. On the section of the surface of the upper transparent plastic layer 15 in which the aluminum film 12M needs to remain, that is, the section corresponding to the reflective portions 12 of the optical element 10, a magnesium fluoride film 14M is formed to an extent sufficient to protect the aluminum film 12M corresponding to the reflective portions 12 from dissolving or change in properties.

The following advantages are achieved by setting the material and thickness of the thin film for forming the reflective portions 12 and the material and thickness of the thin film for forming the protection portions 14 as described above. The difference between the etching speed of the metal film for forming the reflective portions 12 in the section of the upper transparent plastic layer 15 that corresponds to the reflective portions 12 and the etching speed in the section that includes the transmissive portions 13 and does not correspond to the reflective portions 12 can be increased. This facilitates etching of the section to be etched, increasing the productivity of the optical element 10. In addition, the section not to be etched is more likely to maintain its predetermined shape and properties, thereby stabilizing the quality of the optical element 10.

In other words, the thickness of the aluminum film 12M and the thickness of the magnesium fluoride film 14M described above are suitable for the etching of the aluminum film 12M formed on the region of the larger specific surface area.

After the reflective portions 12 and the protection portions 14 are formed, an ultraviolet curable resin, for example, is applied to the back surface 15r of the upper transparent plastic layer 15 and cured. This forms a lower transparent plastic layer 11 covering the reflective portions 12 and the protection portions 14. The step of forming the lower transparent plastic layer 11 may be omitted.

Advantages of the optical element of the first embodiment will now be described.

(1) A single optical element 10 provides diffraction images that are formed by the transmitted light Lt and differ from one another in color, in addition to a reflection image formed by the reflection light Lr. Therefore, additional optical effects are added to the single optical element 10.

(2) The light reflected by the optical element 10 is scattered light that is scattered by the uneven structure, and the light transmitted through the optical element 10 is diffraction light produced by the transmission diffraction portion 20. This clarifies the difference between the light reflected by the optical element 10 and the light transmitted through the optical element 10.

(3) When the grating period d of the transmission periodic portion 17 is greater than 0.20 µm and less than 0.35 µm, the transmission diffraction portion 20 diffracts visible light and transmits only the polarized light that is the component perpendicular to the reflective portions 12 in the visible light that is incident on the transmission diffraction portion 20.

(4) When the grating period d in the transmission periodic portion 17 is between 0.35 µm and 20 µm inclusive, the visible light incident on the transmission diffraction portion 20 is diffracted more reliably.

[Modifications of First Embodiment]

The first embodiment described above may be modified as follows. In FIGS. 13 to 17 described below, the upper transparent plastic layer 15 is not shown for the sake of convenience in explanation of the reflective portions 12.

Each reflective portion 12 may be shaped like a strip that extends along the X axis, instead of the Y axis. In such a structure, the reflective portions 12 are arranged at equal intervals along the Y axis, and the Y axis serves as an example of a given axis. Alternatively, each reflective portion 12 may be shaped like a strip that extends along an extension axis that intersects the Y axis at a predetermined angle other than the right angle. In such a structure, the reflective portions 12 are arranged at equal intervals along the axis perpendicular to the extension axis, and the axis perpendicular to the extension axis serves as an example of a given axis.

The depressions and projections in the back surface 15r of the upper transparent plastic layer 15 do not have to extend along the X axis and may have the shape described below. That is, each of the depressions and projections may extend along an axis that intersects the Y axis at a predetermined angle other than the right angle.

Figure 11:
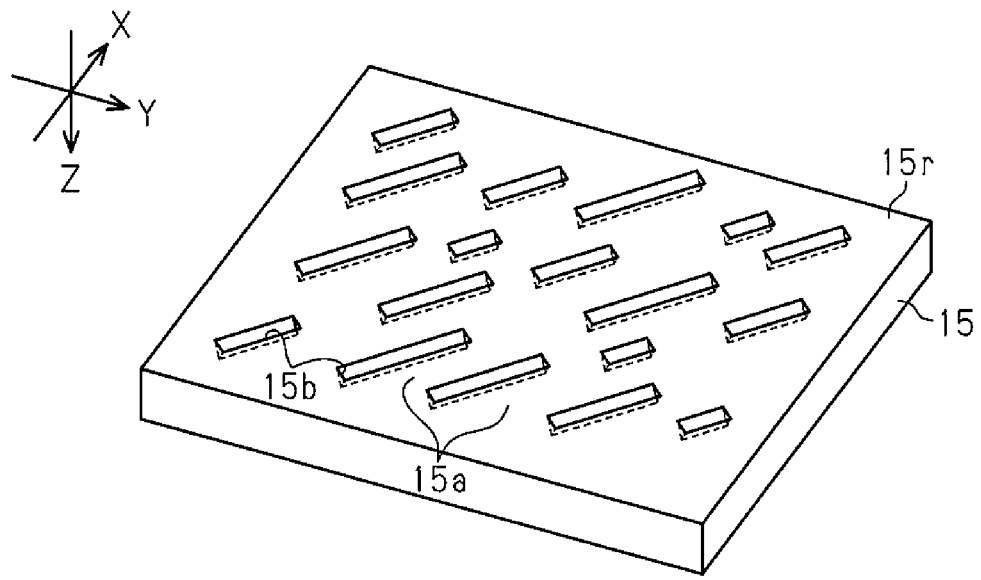
FIG. 11 is a perspective view showing the structure of an upper transparent plastic layer of a modification of the first embodiment.

For example, as shown in FIG. 11, the depressions 15b may extend along the axis that forms an angle of 45° with the Y axis. In this structure, each projection 15a sandwiched by corresponding two depressions 15b that are adjacent to each other along the X axis also extends along the axis that forms an angle of 45° with the Y axis. FIG. 11 shows the upper transparent plastic layer 15 inverted on the Z axis from the position shown in FIG. 2 for the sake of convenience in explanation of the uneven structure of the back surface 15r of the upper transparent plastic layer 15.

The structure including the reflective portions 12 formed on such an upper transparent plastic layer 15 produces, as reflection light Lr, scattered light having directivity along the longitudinal axis of the projections 15a, that is, the axis forming an angle of 45° with the Y axis. Thus, in the optical element 10 including the upper transparent plastic layer 15 that has the back surface 15r in which depressions 15b and projections 15a extend along a predetermined axis, the reflective portions 12 produce, as reflection light, scattered light having directivity along a predetermined axis.

Figure 12:
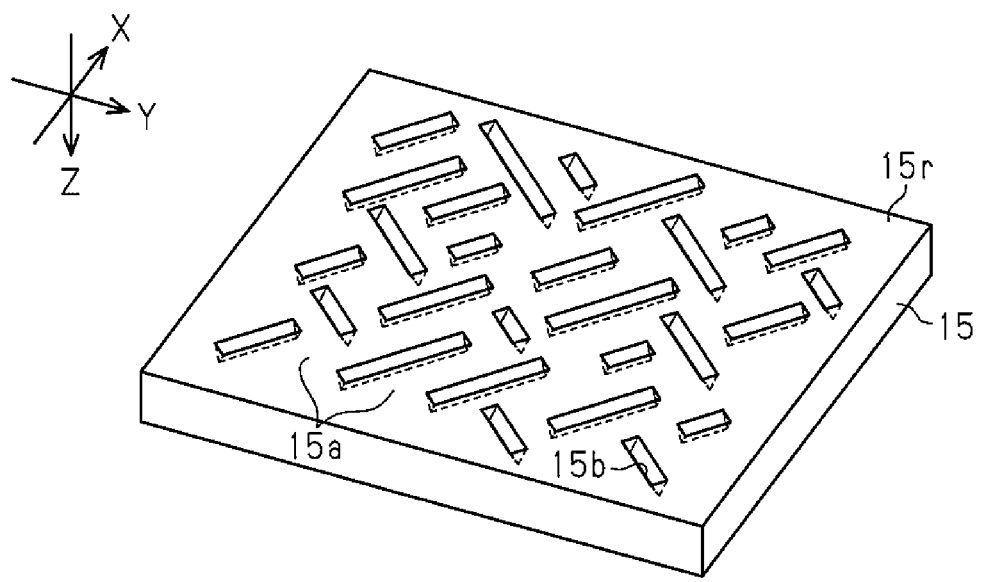
FIG. 12 is a perspective view showing the structure of an upper transparent plastic layer of a modification of the first embodiment.

As shown in FIG. 12, the depressions 15b in the back surface 15r of the upper transparent plastic layer 15 may extend along different axes, and the projections 15a may also extend along different axes. Unlike the optical element 10 including the upper transparent plastic layer 15 shown in FIG. 11, the optical element 10 including the upper transparent plastic layer 15 shown in FIG. 12 produces, from incident light Li and as reflection light Lr, isotropically scattered light that does not have a predetermined directivity. FIG. 12 shows the upper transparent plastic layer 15 inverted on the Z axis from the position shown in FIG. 2 for the sake of convenience in explanation of the uneven structure of the back surface 15r of the upper transparent plastic layer 15.

When the upper transparent plastic layer 15 of the optical element 10 includes the section having the uneven structure that produces scattered light with directivity and the section having the uneven structure that scatters the incident light isotropically, the optical element 10 provides more complex optical effects.

Instead of arranging the depressions and projections in each reflective portion 12 successively and alternately only along the Y axis, the depressions and projections in each reflective portion 12 may be arranged successively and alternately both along the X and Y axes.

Figure 13:
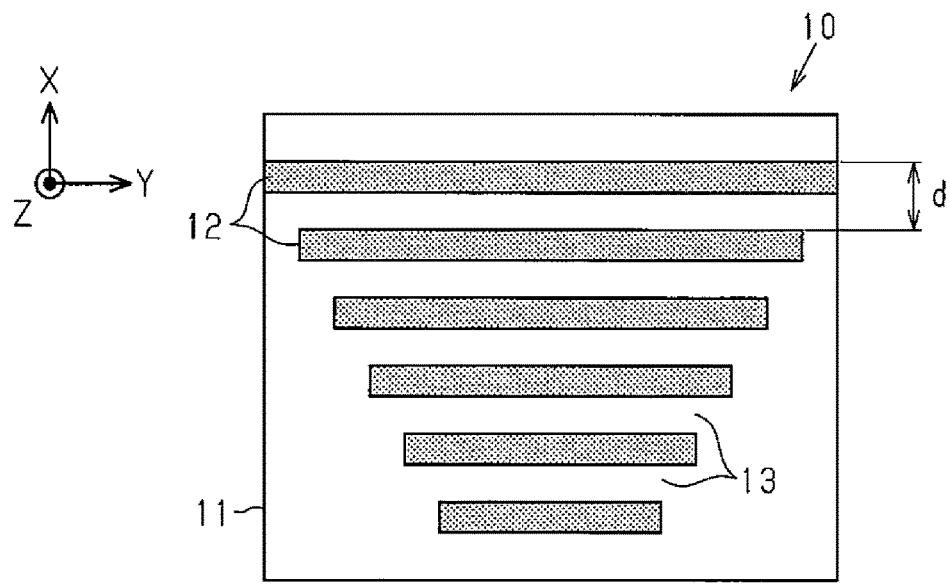
FIG. 13 is a plan view showing the planar structure of the optical element of a modification of the first embodiment as viewed along the Z axis.

As shown in FIG. 13, the reflective portions 12 may have different lengths along the Y axis. For example, the lengths along the Y axis of the reflective portions 12 may gradually decrease from the reflective portion 12 located at one end on the X axis toward the reflective portion 12 located at the other end. Alternatively, the reflective portions 12 may include reflective portions 12 of different lengths along the Y axis, and the reflective portions 12 may be arranged along the X axis without a predetermined regularity in length along the Y axis.

Figure 14:
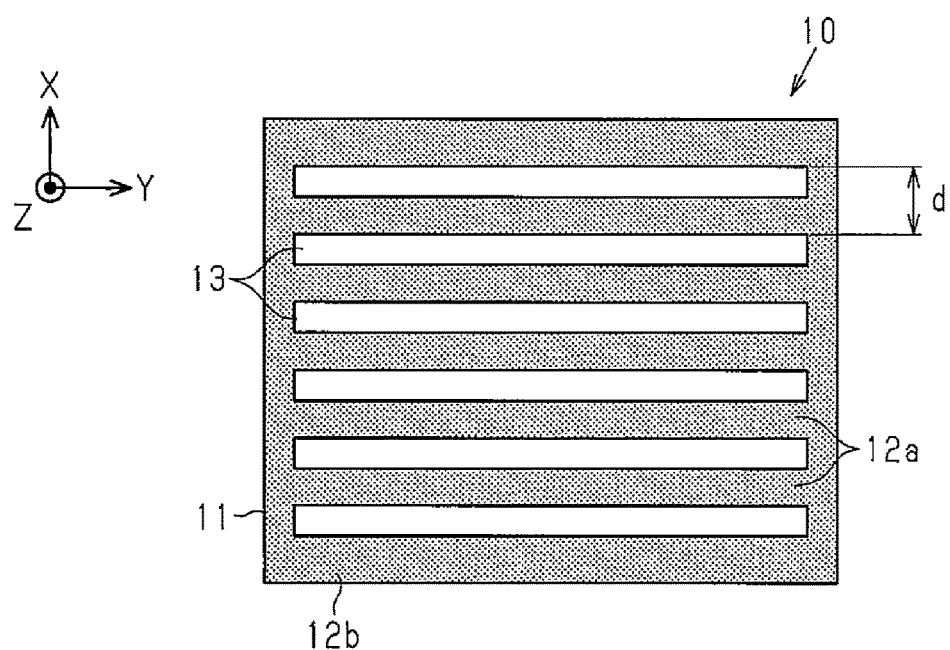
FIG. 14 is a plan view showing the planar structure of the optical element of a modification of the first embodiment as viewed along the Z axis.

As shown in FIG. 14, a single metal film may be formed over the entire surface of the lower transparent plastic layer 11, that is, on the entire back surface 15r of the upper transparent plastic layer 15, and transmissive portions 13 may be defined by the metal film.

In this structure, the transmissive portions 13 may be arranged at equal intervals along the X axis, and each transmissive portion 13 may extend along the Y axis. Alternatively, the transmissive portions 13 may be arranged at equal intervals along the Y axis, and each transmissive portion 13 may extend along the X axis. Further, each transmissive portion 13 may extend along an extension axis that forms a predetermined angle with the Y axis, and the transmissive portions 13 may be arranged at equal intervals along the axis perpendicular to the extension axis.

In this structure, the sections sandwiched by respective transmissive portions 13 function as reflective portions 12a, and the section surrounding the transmissive portions 13 also functions as a reflective portion 12b.

Figure 15:
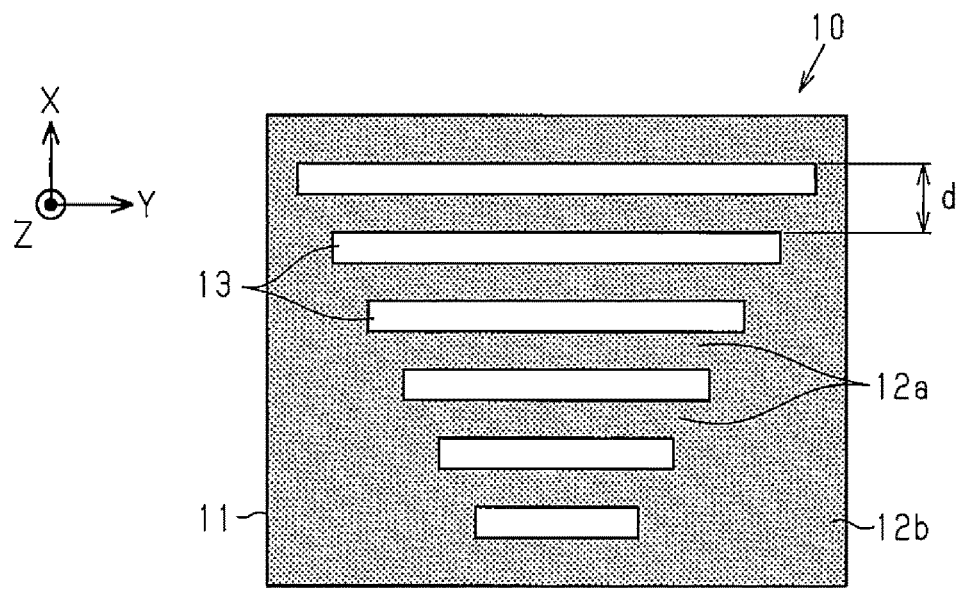
FIG. 15 is a plan view showing the planar structure of the optical element of a modification of the first embodiment as viewed along the Z axis.

As shown in FIG. 15, the optical element 10 shown in FIG. 14 may be modified so that the transmissive portions 13 have different lengths along the Y axis. For example, the lengths along the Y axis of the transmissive portions 13 may gradually decrease from the transmissive portion 13 located at one end on the X axis toward the transmissive portion 13 located at the other end. Alternatively, the transmissive portions 13 may include transmissive portions 13 of different lengths along the Y axis, and the transmissive portions 13 may be arranged on the X axis without a predetermined regularity in length along the Y axis.

Figure 16:
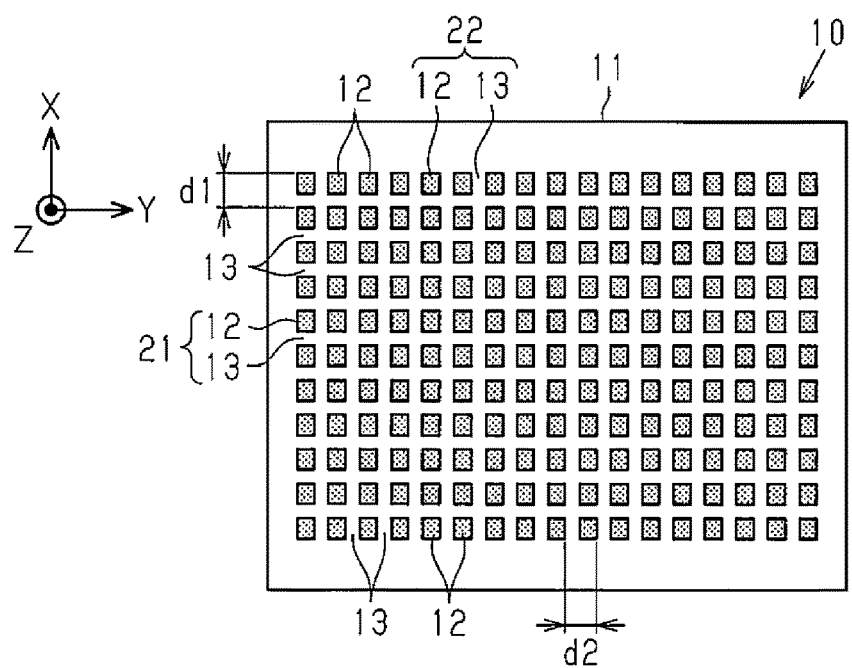
FIG. 16 is a plan view showing the planar structure of the optical element of a modification of the first embodiment as viewed along the Z axis.

As shown in FIG. 16, the optical element 10 may include a plurality of rectangular reflective portions 12, and the reflective portions 12 may be arranged at equal intervals along the X axis and also arranged at equal intervals along the Y axis. This structure includes transmissive portions 13 each extending along the Y axis and located between corresponding two reflective portions 12 that are adjacent to each other along the X axis and transmissive portions 13 each extending along the X axis and located between corresponding two reflective portions 12 that are adjacent to each other along the Y axis. The transmissive portions 13 extending along the Y axis are perpendicular to the transmissive portions 13 extending along the X axis.

A reflective portion 12 and a transmissive portion 13 that are adjacent to each other along the X axis form a first diffraction periodic portion 21. The width of the first diffraction periodic portion 21 along the X axis is a first grating period d1. A reflective portion 12 and a transmissive portion 13 that are adjacent to each other along the Y axis form a second diffraction periodic portion 22. The width of the second diffraction periodic portion 22 along the Y axis is a second grating period d2. The first grating period d1 may be equal to the second grating period d2. However, the first grating period d1 may differ from the second grating period d2.

The optical element 10 shown in FIG. 16 has a so-called cross-grating structure. In transmitted light observation of such an optical element 10 using a bar-shaped light source, such as a fluorescent lamp, the light transmitted through the optical element 10 emanates as iridescent diffraction light when the bar-shaped light source extends parallel to the X axis or when the bar-shaped light source extends parallel to the Y axis.

The reflective portions 12 may be arranged along the Y axis and along an axis that intersects the X axis at a predetermined angle. Alternatively, the reflective portions 12 may be arranged along the X axis and along an axis that intersects the Y axis at a predetermined angle. Further, when an axis along which reflective portions 12 and transmissive portions 13 are arranged successively is a periodicity axis, the optical element 10 may include reflective portions 12 and transmissive portions 13 that are arranged along three or more different periodic axes.

Figure 17:
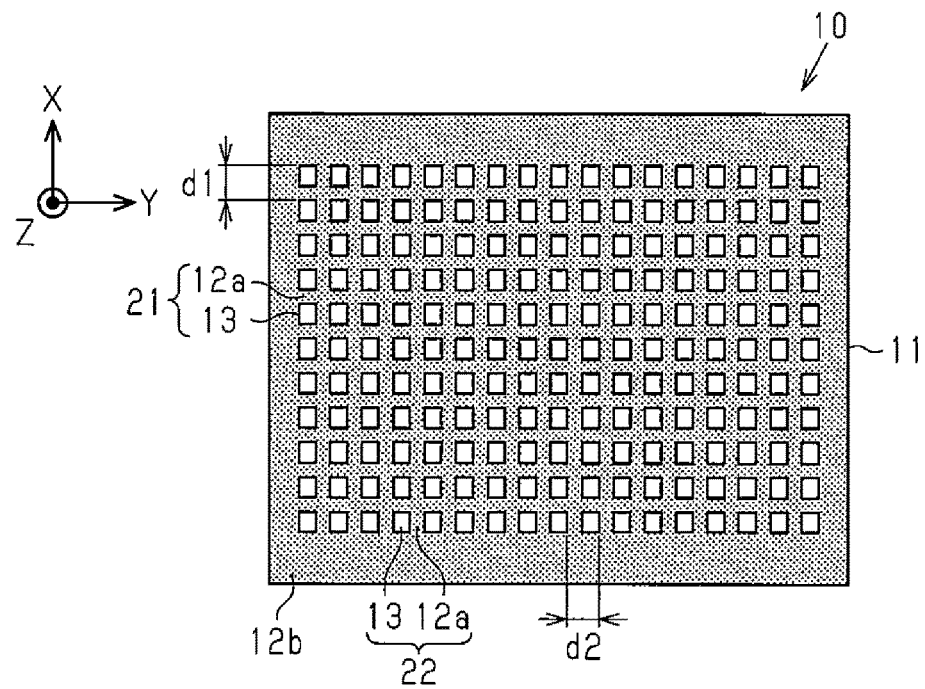
FIG. 17 is a plan view showing the planar structure of the optical element of a modification of the first embodiment as viewed along the Z axis.

As shown in FIG. 17, in the optical element 10, a single metal film may be formed over the entire surface of the lower transparent plastic layer 11, that is, on the entire back surface 15r of the upper transparent plastic layer 15, and transmissive portions 13 may be defined by the metal film.

In this structure, the transmissive portions 13 are arranged at equal intervals along the X axis and at equal intervals along the Y axis. This structure includes reflective portions 12a each extending along the Y axis and located between corresponding two transmissive portions 13 that are adjacent to each other along the X axis and reflective portions 12a each extending along the X axis and located between corresponding two transmissive portions 13 that are adjacent to each other along the Y axis. The reflective portions 12a extending along the Y axis are perpendicular to the reflective portions 12a extending along the X axis. In addition, the section of the metal film surrounding the transmissive portions 13 also serves as a reflective portion 12b.

A reflective portion 12a and a transmissive portion 13 that are adjacent to each other along the X axis form a first diffraction periodic portion 21. The width of the first diffraction periodic portion 21 along the X axis is a first grating period d1. A reflective portion 12a and a transmissive portion 13 that are adjacent to each other along the Y axis form a second diffraction periodic portion 22. The width of the second diffraction periodic portion 22 along the Y axis is a second grating period d2. The first grating period d1 may be equal to the second grating period d2. However, the first grating period d1 may differ from the second grating period d2.

As is the case with the optical element 10 shown in FIG. 16, the optical element 10 shown in FIG. 17 has a so-called cross-grating structure. When the reflective portions 12a of the optical element 10 shown in FIG. 17 are located in the same positions as the transmissive portions 13 of the optical element 10 shown in FIG. 16 and the transmissive portions 13 of the optical element 10 shown in FIG. 17 are located in the same positions as the reflective portions 12 of the optical element 10 shown in FIG. 16, the optical element 10 of FIG. 17 has the same optical effect as the optical element 10 of FIG. 16.

The transmissive portions 13 may be arranged along the Y axis and along an axis that intersects the X axis at a predetermined angle. Alternatively, the transmissive portions 13 may be arranged along the X axis and along an axis that intersects the Y axis at a predetermined angle. Further, when an axis along which reflective portions 12 and transmissive portions 13 are arranged successively is a periodicity axis, the optical element 10 may include reflective portions and transmissive portions 13 that are arranged along three or more different periodicity axes.

As described above, the optical element 10 shown in FIG. 17 may be structured to have the same optical effect as the optical element 10 shown in FIG. 16. Thus, selection between the optical element 10 shown in FIG. 17 and the optical element 10 shown in FIG. 16 may be made depending on the ease of formation of reflective portions.

The optical element 10 does not have to include the protection portions 14. The optical element 10 that does not include the protection portions 14 may be manufactured by the following method.

In the similar manner as the manufacturing method described above, the manufacturing of the optical element 10 starts with formation of an original plate of the upper transparent plastic layer 15 having a non-periodic uneven structure. To form the original plate, a SUS plate is sandblasted to form a non-periodic uneven structure in the surface of the SUS plate, for example. This forms the original plate having a non-periodic uneven structure in the surface. Alternatively, the original plate may be formed by forming a resist film having a non-periodic uneven structure in the surface through photolithography using a laser or electron-beam lithography system, or an exposure system. This forms the original plate having non-periodic uneven structures in the surface. After a conductive film is applied to the formed original plate by a dry coating method, actual products may be formed by electro forming.

Figure 18:
FIG. 18 is a process view showing a step in a manufacturing method of a modification of the first embodiment.

As shown in FIG. 18, replication of the uneven structure in the surface of the original plate forms the upper transparent plastic layer 15 having the non-periodic uneven structure. The upper transparent plastic layer 15 may be formed by a photopolymer method, for example.

The method for forming the upper transparent plastic layer 15 is not limited to the photopolymer method described above and may be other methods such as heat embossing, hot/cold press method, photopolymer method, and nanoimprint method.

Figure 19:
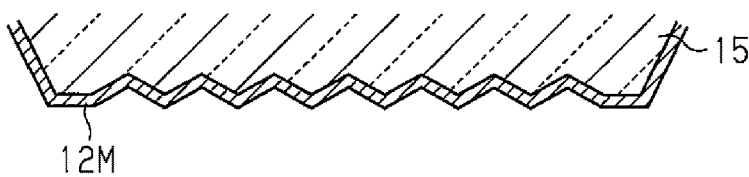
FIG. 19 is a process view showing a step in the manufacturing method of the modification of the first embodiment.

As shown in FIG. 19, the entire surface of the upper transparent plastic layer 15 that has the non-periodic uneven structure is coated by a metal film for forming reflective portions 12, which may be aluminum film 12M, by a dry coating method. The dry coating method for forming the aluminum film 12M may be any of the dry coating methods listed above.

Figure 20:
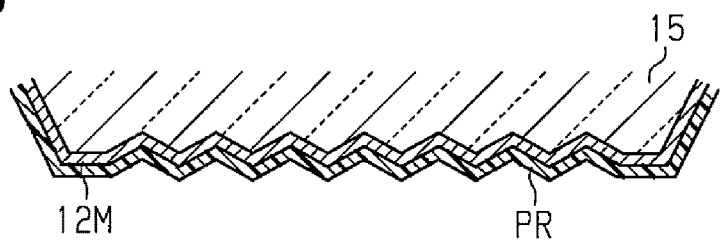
FIG. 20 is a process view showing a step in the manufacturing method of the modification of the first embodiment.

As shown in FIG. 20, a photoresist PR is then applied to the entire surface of the aluminum film 12M.

Figure 21:
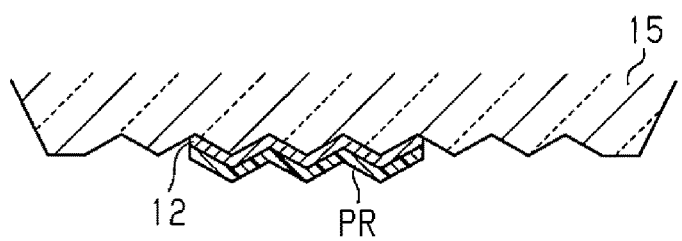
FIG. 21 is a process view showing a step in the manufacturing method of the modification of the first embodiment.

As shown in FIG. 21, the photoresist PR is exposed to a pattern of laser light so that the photoresist PR on the sections of the aluminum film 12M corresponding to reflective portions 12 is cured. This forms a mask used to etch the aluminum film 12M. The section of the photoresist PR that is not cured and the section of the aluminum film 12M that is not covered by the mask are alkaline etched, thereby forming reflective portions 12.

This manufacturing method may also be used to manufacture an optical element 10 including protection portions 14. To form an optical element 10 including protection portions 14, a thin film for forming protection portions 14, which may be a magnesium fluoride film, is formed before applying the photoresist PR. Then, the magnesium fluoride film is etched after developing the photoresist PR and before alkaline etching the aluminum film 12M.

The optical element 10 may be manufactured by a method other than the method described above, such as washing see-light treatment or a method that physically removes the metal film. In the washing see-light treatment, a water-soluble resin is applied to the section of the upper transparent plastic layer 15 corresponding to transmissive portions 13, and then a metal film for forming reflective portions 12 is formed by a dry coating method. Then, the upper transparent plastic layer 15 on which the water-soluble resin and the metal film are formed is washed with water, thereby removing the water-soluble resin and the metal film formed on the water-soluble resin.

The method that physically removes the metal film physically removes the section of the metal layer corresponding to transmissive portions 13 by directing laser light in a pattern.

After the reflective portions 12 are formed, an ultraviolet curable resin, for example, is applied to the back surface 15r of the upper transparent plastic layer 15 and cured. This forms the lower transparent plastic layer 11 covering the reflective portions 12 and the protection portions 14. However, the lower transparent plastic layer 11 may be omitted.

As described above, in the method for manufacturing an optical element 10 without protection portions 14, the reflective portions 12 may be formed on the lower transparent plastic layer 11 instead of on the upper transparent plastic layer 15. In this case, the upper transparent plastic layer 15 may be omitted.

[Second Embodiment]

Referring to FIGS. 22 to 27, an optical element according to a second embodiment will now be described. The optical element of the second embodiment is the same as the optical element of the first embodiment in that the reflective portions scatter the incident light, but differs from the first embodiment in the structure of the reflective portions for scattering the incident light. Thus, the following descriptions will focus on this difference. Same reference numerals are given to those components that are the same as the corresponding components of the optical element of the first embodiment. Such components will not be described in detail. In the following descriptions, the structure of the optical element and the operation of the optical element are described in this order.

[Structure of Optical Element]

Figure 22:
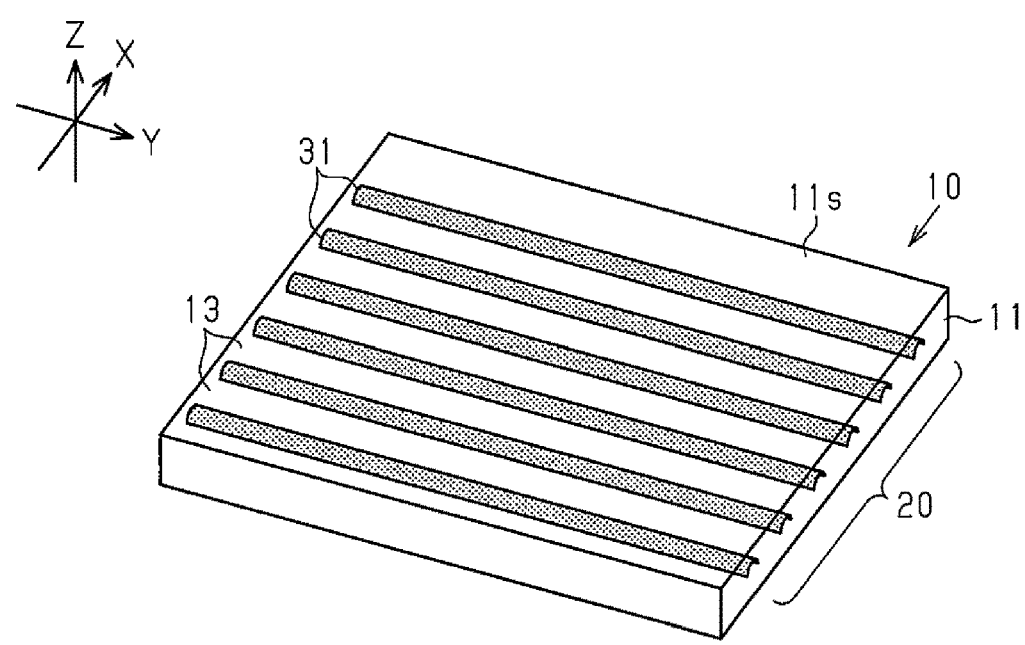
FIG. 22 is a perspective view showing the structure of an optical element according to a second embodiment of the present invention.
Figure 23:
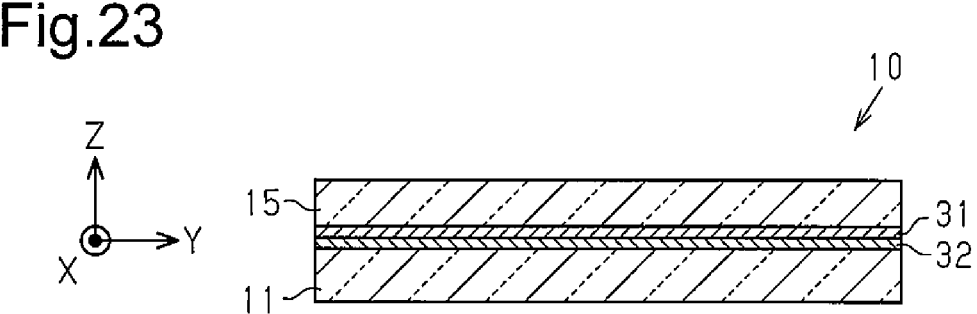
FIG. 23 is a cross-sectional view showing the cross-sectional structure in a Z-Y plane of the optical element of the second embodiment.
Figure 24:
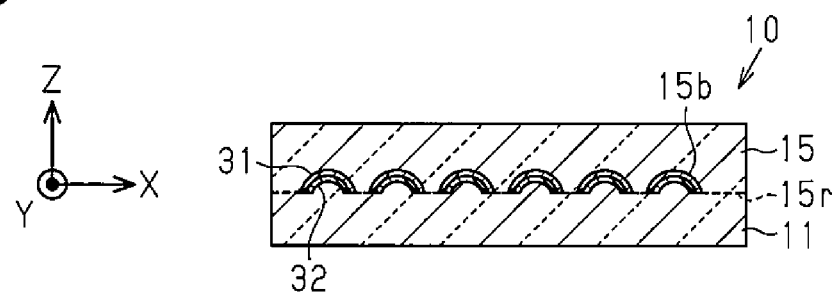
FIG. 24 is a cross-sectional view showing the cross-sectional structure in a Z-X plane of the optical element of the second embodiment.
Figure 25:
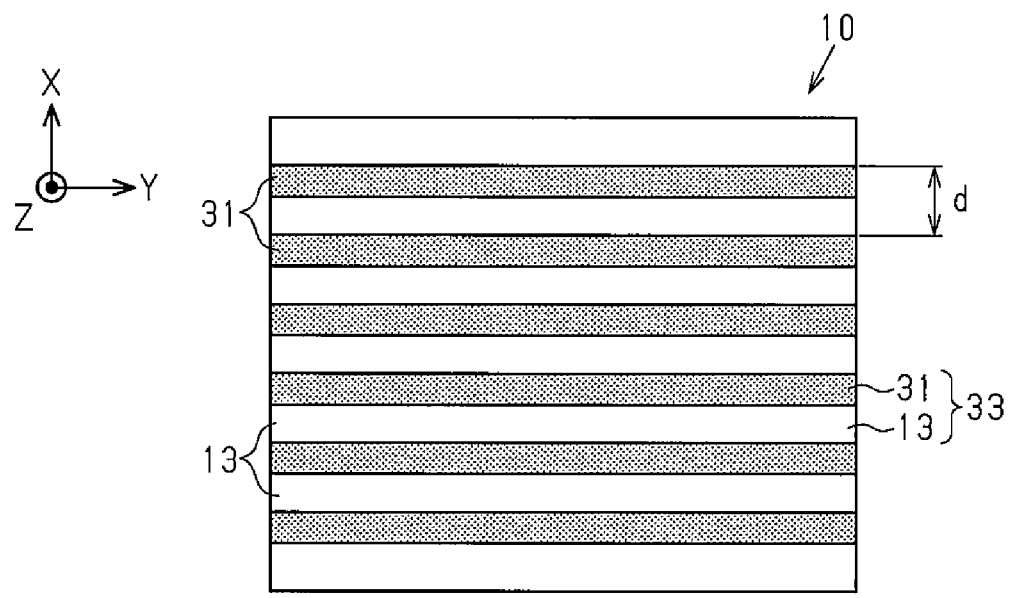
FIG. 25 is a plan view showing the planar structure of the optical element according to the second embodiment as viewed along the Z axis.

Referring to FIGS. 22 to 25, the structure of the optical element will now be described. In FIGS. 22 and 25, the upper transparent plastic layer is not shown for the sake of convenience in explanation of the structure of the optical element. In FIGS. 22 and 25, to clarify the positions of the reflective portions relative to the lower transparent plastic layer, the reflective portions are shaded with dots. Further, the uneven structure formed in the surface of the lower transparent plastic layer is not shown in FIG. 22 for illustrative purposes.

As shown in FIG. 22, an optical element 10 includes a plurality of reflective portions 31 formed over a surface 11s of the lower transparent plastic layer 11. Each reflective portion 31 is shaped like a strip extending along the Y axis. The reflective portions 31 are arranged at equal intervals along the X axis, which is an example of a first axis. Each reflective portion 31 has a semicylindrical surface protruding away from the surface 11s. The semicylindrical surface of each reflective portion 31 extends over the entire length along the Y axis of the reflective portion 31. However, it is sufficient that at least part of each reflective portion 31 on the Y axis have the semicylindrical surface. The Y axis is an example of a second axis. The semicylindrical surface of each reflective portion 31 extends over the entire length along the X axis of the reflective portion 31. However, it is sufficient that at least part of each reflective portion 31 on the X axis have the semicylindrical surface.

As shown in FIG. 23, since each reflective portion 31 has a semicylindrical surface, the position of the reflective portion 31 on the Z axis does not change over the entire extent along the Y axis as viewed in a cross-section taken along a Z-Y plane. Further, since each protection portion 32 has a semicylindrical surface, the position of the protection portion 32 on the Z axis does not change over the entire extent along the Y axis as viewed in a cross-section taken along a Z-Y plane.

As shown in FIG. 24, the surface of the upper transparent plastic layer 15 that is in contact with the lower transparent plastic layer 11 is a back surface 15r. The back surface 15r of the upper transparent plastic layer 15 includes depressions 15b arranged at equal intervals along the X axis. Each depression 15b is defined by a cylindrical surface extending along the Y axis.

Each reflective portion 31 is formed conforming to a corresponding depression 15b so that the reflective portion 31 has a semicylindrical surface that conforms to the shape of the depression 15b. Each protection portion 32 is formed conforming to a corresponding depression 15b in the same manner as the reflective portion 31 so that the protection portion 32 has a semicylindrical surface that conforms to the shape of the depression 15b.

As shown in FIG. 25, a reflective portion 31 and a transmissive portion 13 that are adjacent to each other along the X axis form one transmission periodic portion 33. The grating period d of the transmission periodic portion 33 is preferably greater than 0.20 μm and 20 μm or less, as is the case with the grating period d in the first embodiment.

[Operation of Optical Element]

Figure 26:
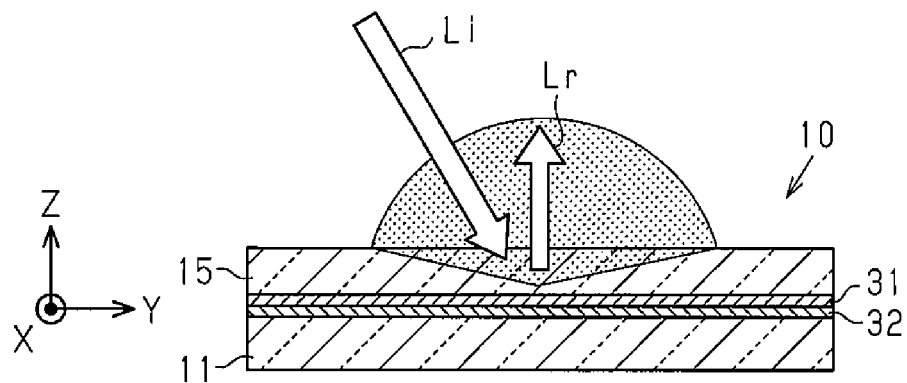
FIG. 26 is an operation diagram showing the optical effect of reflection of the light incident on the optical element of the second embodiment.
Figure 27:
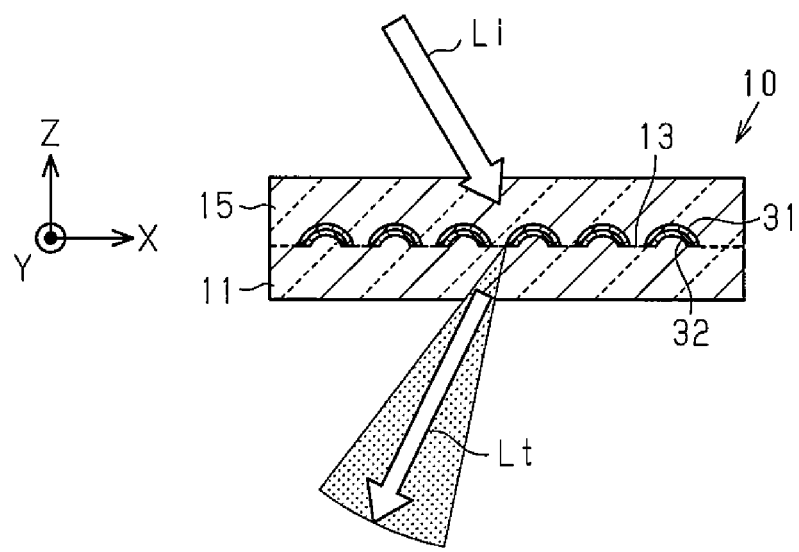
FIG. 27 is an operation diagram showing the optical effect of transmission of the light incident on the optical element of the second embodiment.

Referring to FIGS. 26 and 27, the operation of the optical element will now be described.

As shown in FIG. 26, when light is incident on the reflective portions 31 of the optical element 10 through the upper transparent plastic layer 15, the reflective portions 31, each shaped as a convex protruding toward the upper transparent plastic layer 15, reflect the incident light Li in directions depending on the sections of the reflective portions 31 on which the incident light Li is incident. In other words, each reflective portions 12 produces scattered light as reflection light Lr. As such, when the incident light Li is white visible light, the optical element 10 reflects white scattered light.

As shown in FIG. 27, when light is incident on the reflective portions 31 of the optical element 10 through the upper transparent plastic layer 15, the incident light Li passes through the transmissive portions 13 and emanates from the back surface of the lower transparent plastic layer 11, which is opposite to the surface 11s, as transmitted light Lt. Here, the transmission diffraction portion 20 diffracts the light rays of different wavelengths in the incident light Li at angles that vary depending on light ray and forms diffraction images that differ from one another in color.

Accordingly, in reflected light observation, the observer of the optical element 10 observes white scattered light, which is scattered by the reflective portion 12. In transmitted light observation, the observer observes iridescent diffraction light, which is diffracted by the transmission diffraction portion 20.

An advantage of the optical element of second embodiment will now be described.

(5) The light reflected by the optical element 10 is scattered light that is scattered by the semicylindrical surfaces, and the light transmitted through the optical element 10 is diffraction light that is diffracted by the transmission diffraction portion 20. This clarifies the difference between the light reflected by the optical element 10 and the light transmitted through the optical element 10.

[Modifications of Second Embodiment]

The second embodiment described above may be modified as follows.

Each of the reflective portions 31 may be shaped like a strip that extends along the X axis, instead of the Y axis. In such a structure, the reflective portions 31 are arranged at equal intervals along the Y axis. Alternatively, each reflective portion 31 may be shaped like a strip extending along an extension axis that intersects the Y axis at a predetermined angle other than the right angle. In such a structure, the reflective portions 31 are arranged at equal intervals along the axis perpendicular to the extension axis.

The reflective portions 31 may have different lengths along the Y axis. For example, the lengths along the Y axis of the reflective portions 31 may gradually decrease from the reflective portion 31 located at one end on the X axis toward the reflective portion 31 located at the other end. Alternatively, the reflective portions 31 may include reflective portions 31 of different lengths along the Y axis, and the reflective portions 31 may be arranged along the X axis without a predetermined regularity in length along the Y axis. That is, the modification of the first embodiment shown in FIG. 13 may be combined with the reflective portions 31 of the second embodiment.

In the optical element 10, a single metal film may be formed over the entire surface of the lower transparent plastic layer 11, that is, on the entire back surface 15r of the upper transparent plastic layer 15, and the transmissive portions 13 may be defined by the metal film. That is, the modification of the first embodiment shown in FIG. 14 may be combined with the reflective portions 31 of the second embodiment.

In the optical element 10, a single metal film may be formed over the entire surface of the lower transparent plastic layer 11, that is, on the entire back surface 15r of the upper transparent plastic layer 15, and the transmissive portions 13 may be defined by the metal film. In addition, the transmissive portions 13 may include transmissive portions 13 of different lengths along the Y axis. That is, the modification of the first embodiment shown in FIG. 15 may be combined with the reflective portions 31 of the second embodiment.

The optical element 10 may include a cross-grating structure. That is, the modification of the first embodiment shown in FIG. 16 may be combined with the reflective portions 31 of the second embodiment. Further, the modification of the first embodiment shown in FIG. 17 may be combined with the reflective portions 31 of the second embodiment.

[Third Embodiment]

Referring to FIGS. 28 to 33, an optical element according to a third embodiment will now be described. The optical element of the third embodiment differs from the optical element of the first embodiment in the structure of the reflective portions and the optical effect obtained by the reflective portions. Thus, the following descriptions will focus on these differences. Same reference numerals are given to those components that are the same as the corresponding components of the optical element of the first embodiment. Such components will not be described in detail. In the following descriptions, the structure of the optical element and the operation of the optical element are described in this order.

[Structure of Optical Element]

Figure 28:
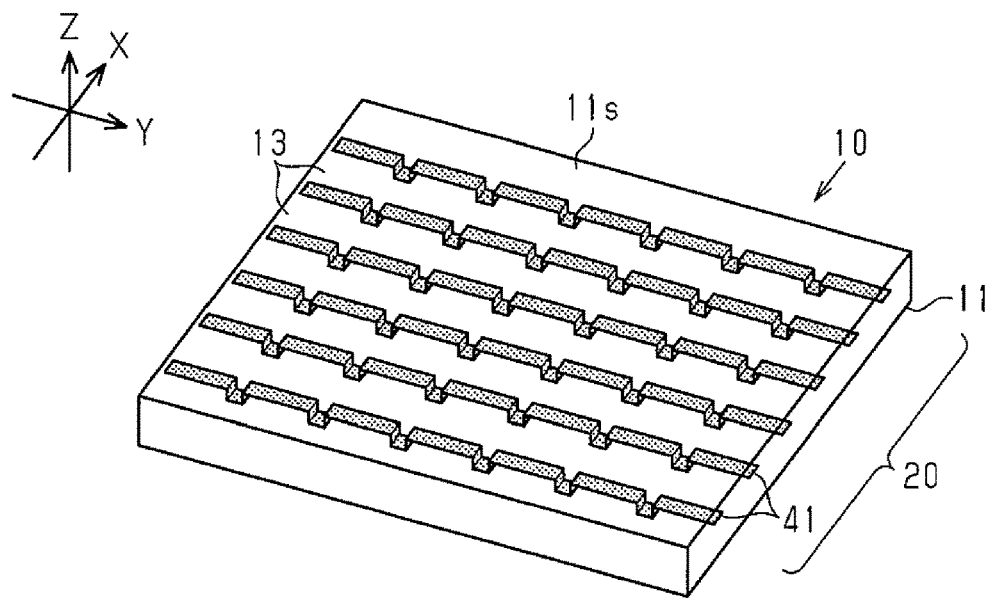
FIG. 28 is a perspective view showing the structure of an optical element according to a third embodiment of the present invention.
Figure 29:
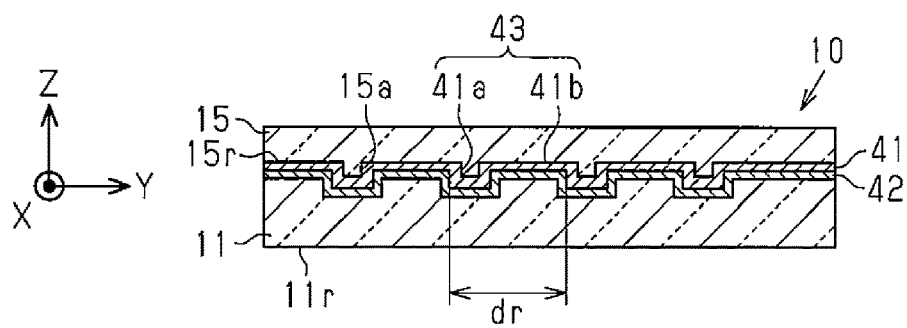
FIG. 29 is a partial cross-sectional view showing the cross-sectional structure in a Z-Y plane of the optical element of the third embodiment.
Figure 30:
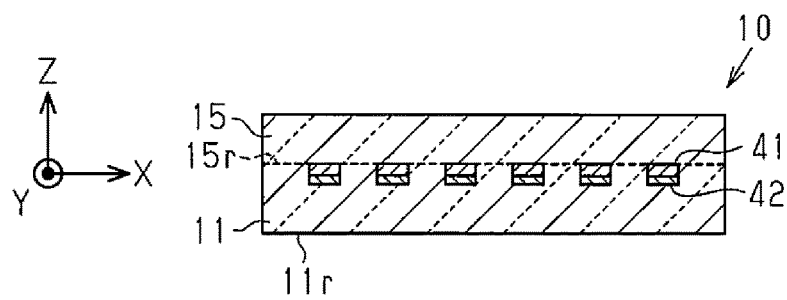
FIG. 30 is a cross-sectional view showing the cross-sectional structure in a Z-X plane of the optical element of the third embodiment.
Figure 31:
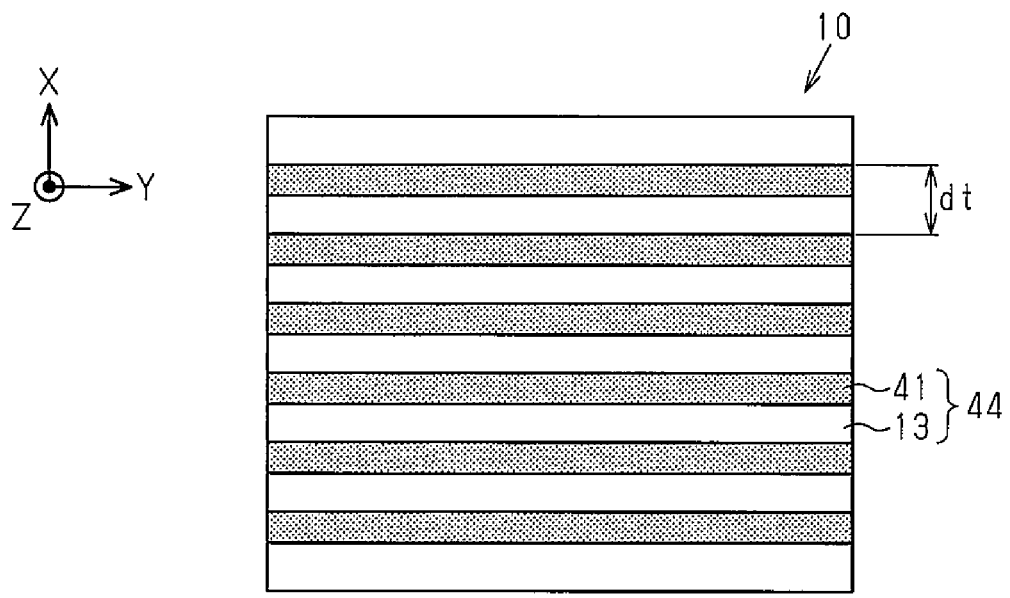
FIG. 31 is a plan view showing the planar structure of the optical element according to the third embodiment as viewed along the Z axis.

Referring to FIGS. 28 to 31, the structure of the optical element will now be described. In FIGS. 28 and 31, the upper transparent plastic layer is not shown for the sake of convenience in explanation of the structure of the optical element. In FIGS. 28 and 31, to clarify the position of the reflective portions relative to the lower transparent plastic layer, the reflective portions are shaded with dots. Further, the uneven structure formed in the surface of the lower transparent plastic layer is not shown in FIG. 28 for illustrative purposes.

As shown in FIG. 28, the optical element 10 includes a plurality of reflective portions 41 formed over the surface 11s of the lower transparent plastic layer 11. Each of the reflective portions 41 is shaped like a strip extending along the Y axis. The reflective portions 41 are arranged at equal intervals along the X axis.

As shown in FIG. 29, the back surface 15r of the upper transparent plastic layer 15 includes projections 15a arranged at equal intervals along the Y axis. Each projection 15a is a ridge that extends along the X axis and has a rectangular cross-sectional shape along the Z-Y axes. The projections 15a are identical in the protrusion amount along the Z axis toward the back surface 11r of the lower transparent plastic layer 11.

Each reflective portion 41 is shaped like a strip extending along the Y axis on the back surface 15r of the upper transparent plastic layer 15. Thus, each reflective portion 41 has a structure that conforms to the section of the back surface 15r of the upper transparent plastic layer 15 where the reflective portion 41 is located. That is, each reflective portion 41 includes a plurality of depressions 41a, which extends toward the back surface 11r of the lower transparent plastic layer 11, and a plurality of projections 41b, which is farther from the back surface 11r of the lower transparent plastic layer 11 than the depressions 41a along the Z axis.

In each reflective portion 41, the depressions 41a and the projections 41b are arranged successively and alternately along the Y axis. The axis along which the depressions 41a and the projections 41b are arranged successively and alternately is a periodicity axis. That is, the reflective portion 41 has an uneven structure that is periodic along the Y axis. In a reflective portion 41, a depression 41a and a projection 41b that are adjacent to each other along the Y axis form one reflection periodic portion 43. The width of the reflection periodic portion 43 along the Y axis is a grating period dr. The depressions 41a and the projections 41b are arranged successively and alternately over the entire extent along the Y axis of the reflective portion 41. However, it is sufficient that depressions 41a and projections 41b are arranged successively and alternately over a part on the Y axis.

When the grating period dr is between 0.15 μm and 20 μm inclusive, the reflective portions 41 forms a plurality of diffraction images with diffraction light diffracted by the reflection periodic portions 43, and the diffraction images differ from one another in color. That is, the reflective portions 41 form reflection images by rendering the reflection angle of the light reflected by the reflective portions 41 different from the angle of the light incident on the reflective portions 41.

The grating period dr is preferably between 0.5 μm and 10 μm inclusive. When the grating period dr is between 0.5 μm and 10 μm inclusive, the viewing angle of the diffraction image is increased compared with when the grating period dr is outside of this range.

When the grating period dr is less than the wavelength of light in the visible light region, the reflective portions 41 form a subwavelength grating, and the reflective portions 41 can separate polarized light from the incident light. In order for the subwavelength grating to separate polarized light from light in the visible light region, light in the range from 400 to 700 nm, for example, the grating period dr preferably has a length of 0.15 μm or more and less than 0.35 μm, which is less than half the length of visible light wavelengths. More preferably, the grating period dr is between 0.15 μm and 0.30 μm inclusive.

When the grating period dr is greater than 0.20 μm and less than 0.35 μm, the reflective portions 41 diffract visible light and reflect only the polarized light that is the component perpendicular to the reflective portions 41.

In the similar manner as the reflective portions 41, each protection portion 42 has a structure that conforms to the section of the back surface 15r of the upper transparent plastic layer 15 where the protection portion 42 is located.

FIG. 30 shows a cross-sectional shape of the optical element 10 in the Z-X plane. As described above, the projections 15a formed on the back surface 15r of the upper transparent plastic layer 15 extend along the X axis. The projections 15a are identical in the extension amount along the Z axis toward the back surface 11r of the lower transparent plastic layer 11. Therefore, the reflective portions 41 are identical in position on the Z axis, and the protection portions 42 are identical in position on the Z axis.

As shown in FIG. 31, a reflective portion 41 and a transmissive portion 13 that are adjacent to each other along the X axis form one transmission periodic portion 44. The grating period dt of the transmission periodic portion 44 is preferably more than 0.20μ and 20 μm or less, as is the case with the grating period d in the first embodiment.

[Operation of Optical Element]

Figure 32:
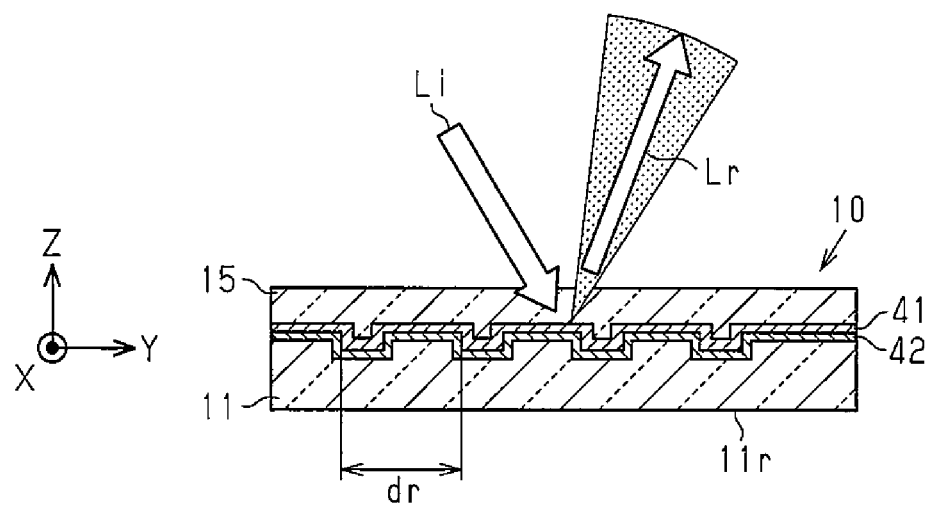
FIG. 32 is an operation diagram showing the optical effect of reflection of the light incident on the optical element of the third embodiment.
Figure 33:
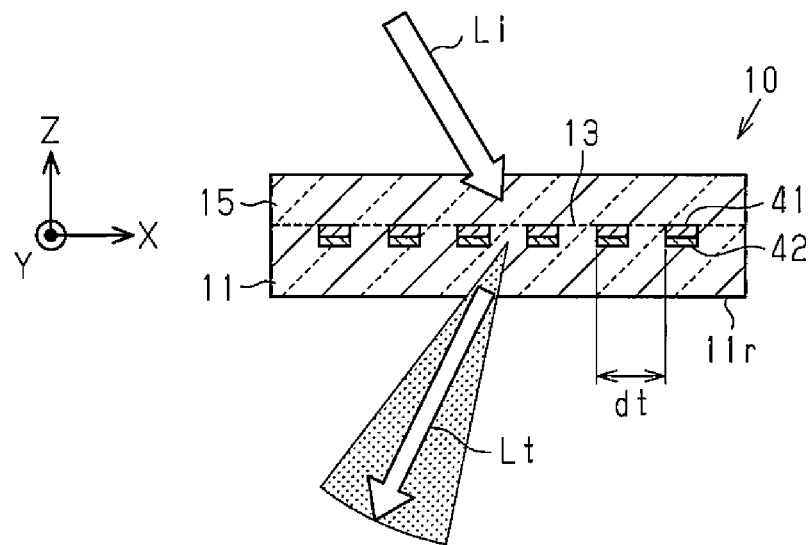
FIG. 33 is an operation diagram showing the optical effect of transmission of the light incident on the optical element of the third embodiment.

Referring to FIGS. 32 and 33, the operation of the optical element will now be described.

As shown in FIG. 32, when light is incident on the reflective portions 41 of the optical element 10 through the upper transparent plastic layer 15, the reflective portions 41, which function as reflective diffraction grating, reflect the incident light Li. In other words, the reflective portions 41 produce diffraction light as reflection light Lr. As such, when the incident light Li is white visible light, the reflective portions 41 produce iridescent diffraction light as reflection light Lr.

As shown in FIG. 33, when light is incident on the reflective portions 41 of the optical element 10 through the upper transparent plastic layer 15, the incident light Li passes through the transmissive portions 13 and emanates from the back surface 11r of the lower transparent plastic layer 11, which is opposite to the surface 11s, as transmitted light Lt. Here, the transmission diffraction portion 20 diffracts the light rays of different wavelengths in the incident light Li at angles that vary depending on light ray and forms diffraction images that differ from one another in color.

Accordingly, in reflected light observation, the observer of the optical element 10 observes iridescent diffraction light reflected by the reflective portions 41. In transmitted light observation, the observer observes iridescent diffraction light diffracted by the transmission diffraction portion 20.

The diffraction light diffracted by the reflective portions 41 may be the same as or different from the diffraction light diffracted by the transmission diffraction portion 20.

Advantages of the optical element of the third embodiment will now be described.

(6) Both of the light reflected by the optical element 10 and the light transmitted through the optical element 10 are diffraction light. Thus, in order to produce the optical effects of the optical element 10, the diffraction state of the diffraction light resulting from transmission and the diffraction state of the diffraction light resulting from reflection are both required to be the same as those of the optical element 10. This increases the difficulty in reproducing the optical element 10.

(7) When the grating period dr of the reflection periodic portions 43 is greater than 0.20 μm and less than 0.35 μm, the reflection periodic portions 43 diffract visible light and transmit only the polarized light that is the component perpendicular to the reflective portions 41 in the visible light that is incident on the reflective portions 41.

(8) When the grating period dr of the reflection periodic portions 43 is between 0.35 μm and 20 μm inclusive, the visible light incident on the reflective portions 41 is diffracted more reliably.

[Modifications of Third Embodiment]

The third embodiment described above may be modified as follows.

Each reflective portion 41 may be shaped like a strip that extends along the X axis, instead of the Y axis. In this structure, the reflective portions 41 are arranged at equal intervals along the Y axis. Each reflective portion 41 may be shaped like a strip that extends along an extension axis that intersects the Y axis at a predetermined angle other than the right angle. In this structure, the reflective portions 41 may be arranged at equal intervals along the axis perpendicular to the extension axis.

The reflective portions 41 may have different lengths along the Y axis. For example, the lengths along the Y axis of the reflective portions 41 may gradually decrease from the reflective portion 41 located at one end on the X axis toward the reflective portion 41 located at the other end. Alternatively, the reflective portions 41 may include reflective portions 41 of different lengths along the Y axis, and the reflective portions 41 may be arranged along the X axis without a predetermined regularity in length along the Y axis. That is, the modification of the first embodiment shown in FIG. 13 may be combined with the reflective portions 41 of the third embodiment.

In the optical element 10, a single metal film may be formed over the entire surface of the lower transparent plastic layer 11, that is, on the entire back surface 15r of the upper transparent plastic layer 15, and the transmissive portions 13 may be defined by the metal film. That is, the modification of the first embodiment shown in FIG. 14 may be combined with the reflective portions 41 of the third embodiment.

In the optical element 10, a single metal film may be formed over the entire surface of the lower transparent plastic layer 11, that is, on the entire back surface 15r of the upper transparent plastic layer 15, and the transmissive portions 13 may be defined by the metal film. In addition, the transmissive portions 13 may include transmissive portions 13 of different lengths along the Y axis. That is, the modification of the first embodiment shown in FIG. 15 may be combined with the reflective portions 41 of the third embodiment.

The optical element 10 may include a cross-grating structure. That is, the modification of the first embodiment shown in FIG. 16 and the reflective portions 41 of the third embodiment may be combined. Further, the modification of the first embodiment shown in FIG. 17 may be combined with the reflective portions 41 of the third embodiment.

The depressions 41a and the projections 41b, which form the reflection periodic portions 43, are arranged successively and alternately along the Y axis. However, the depressions 41a and the projections 41b, which form the reflection periodic portions 43, may be arranged successively and alternately along the X axis and arranged successively and alternately along the Y axis. Alternatively, the depressions 41a and projections 41b, which form the reflection periodic portions 43, may be arranged successively and alternately along a periodicity axis that intersects the Y axis at a predetermined angle other than the right angle, and arranged successively and alternately along the axis perpendicular to the periodicity axis.

When the reflection periodic portion 43 is a first periodic section, the optical element 10 may include a second periodic section having an uneven structure that differs in periodicity from the uneven structure of the first periodic section. The second periodic section differs from the first periodic section in at least one of grating period and periodicity axis. The visible light incident on the reflective portion is diffracted by the first periodic section in a direction that is different from the direction in which the visible light is diffracted by the second periodic section. That is, in the reflective portions 41, a single reflective portion 41 may include the first periodic section and the second periodic section. Alternatively, the reflective portions 41 may include a reflective portion 41 that has only the first periodic section and a reflective portion 41 that has only the second periodic section.

The structures described above have the following advantage.

(9) The light reflected by the optical element 10 is a combination of two diffraction light rays of different states. This increases the difficulty in reproducing the optical effects.

[Fourth Embodiment]

Figure 34:
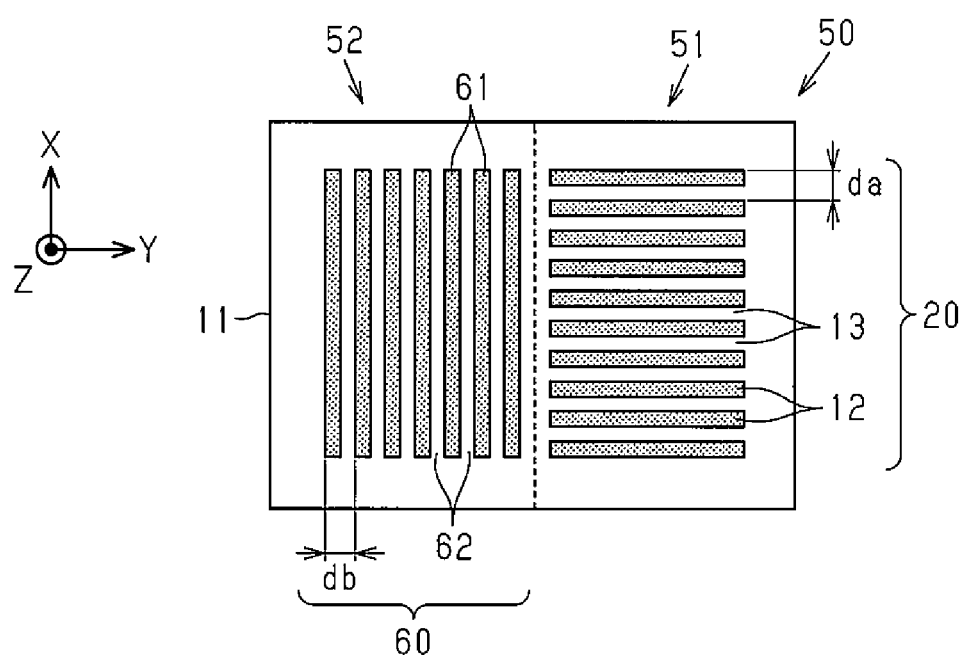
FIG. 34 is a plan view showing the planar structure of the optical element according to a fourth embodiment of the present invention as viewed along the Z axis.

Referring to FIG. 34, an optical element according to a fourth embodiment will now be described. The optical element of the fourth embodiment differs from the optical element of the first embodiment in that the single optical element includes two element portions having different optical effects. Thus, the following descriptions will focus on this difference. Same reference numerals are given to those components that are the same as the corresponding components of the optical element of the first embodiment. Such components will not be described in detail. In the following descriptions, the structure of the optical element and the operation of the optical element are described in this order.

[Structure of Optical Element]

Referring to FIG. 34, the structure of the optical element will now be described. In FIG. 34, for the sake of convenience in explanation of the reflective portions and transmissive portions of the optical element, the upper transparent plastic layer is not shown, and the reflective portions are shaded with dots.

As shown in FIG. 34, an optical element 50 includes a first element portion 51 and a second element portion 52, which are defined on one lower transparent plastic layer 11. In the similar manner as the optical element 10 of the first embodiment, the first element portion 51 includes a plurality of reflective portions 12 arranged at equal intervals along the X axis. Each reflective portion 12 is shaped like a strip extending along the Y axis. Each reflective portion 12 has a non-periodic uneven structure. In the first element portion 51, the ratio between the sum of areas of all reflective portions 12 and the sum of areas of sections that transmit light, including the transmissive portions 13, is a first area ratio S1.

The reflective portions 12 and the transmissive portions 13 are arranged successively and alternately along the X axis. A plurality of reflective portions 12 and a plurality of transmissive portions 13 form a transmission diffraction portion 20, which has a predetermined grating period da. The axis along which the reflective portions 12 and the transmissive portion 13 are arranged successively and alternately is a periodicity axis. The periodicity axis in the first element portion 51 is parallel to the X axis.

The second element portion 52 includes a plurality of reflective portions 61 arranged at equal intervals along the Y axis. Each reflective portion 61 is shaped like a strip extending along the X axis. The reflective portion 61 is an example of a scattering portion. Each of transmissive portions 62 is sandwiched by corresponding two reflective portions 61 that are adjacent to each other along the Y axis so that the transmissive portions 62 occupy the space between the reflective portions 61. In the similar manner as the reflective portions 61, the transmissive portions 62 are arranged at equal intervals along the Y axis. Each transmissive portion 62 is shaped like a strip extending along the X axis. The transmissive portion 62 is an example of a second transmissive portion.

As is the case with the reflective portion 12 in the first element portion 51, the reflective portion 61 has a non-periodic uneven structure. In the second element portion 52, the ratio between the sum of areas of all reflective portions 61 and the sum of areas of sections that transmit light, including the transmissive portions 62, is a second area ratio S2, which may be equal to the first area ratio S1. However, the first area ratio S1 may differ from the second area ratio S2.

The reflective portions 61 and the transmissive portions 62 are arranged successively and alternately along the Y axis. A plurality of reflective portions 61 and a plurality of transmissive portions 62 form a transmission diffraction portion 60, which has a predetermined grating period db. The grating period db of the transmission diffraction portion 60 in the second element portion 52 is equal to the grating period da of the transmission diffraction portion 20 in the first element portion 51. The axis along which the reflective portions 61 and the transmissive portions 62 are arranged successively and alternately is a periodicity axis. The periodicity axis in the second element portion 52 is parallel to the Y axis. That is, the periodicity axis in the second element portion 52 is perpendicular to the periodicity axis in the first element portion 51.

[Operation of Optical Element]

With the optical element 50, the reflection light from the first element portion 51 and the reflection light from the second element portion 52 are both scattered light. As such, when the incident light is white visible light, white light is observed emanating from both of the first and second element portions 51 and 52 in reflected light observation.

In transmitted light observation in which a point light source is positioned on the opposite side of the upper transparent plastic layer 15 from the reflective portions 12 and the light is incident on the optical element 50 along the Z axis, iridescent diffraction light is observed emanating from both of the first and second element portions 51 and 52 within the viewing angles of the element portions.

In transmitted light observation in which a bar-shaped light source extending along the Y axis, such as a fluorescent lamp, is positioned on the opposite side of the upper transparent plastic layer 15 from the reflective portions 12 and the light is incident on the optical element 50 along the Z axis, iridescent diffraction light is observed in the first element portion 51, whereas diffraction light is not observed in the second element portion 52.

Since the light emitted by the point light source is substantially parallel light, the diffraction light is scattered at dispersion angles according to wavelengths and regardless of the periodicity axis of the transmission diffraction portion. This results in the iridescent diffraction light being observed. In contrast, the bar-shaped light source extends along one axis and provides a greater incident angle. Thus, in the transmission diffraction portion having reflective portions and transmissive portions extending along an axis that intersects the axis along which the bar-shaped light source extends, diffraction light rays of different wavelengths are combined, and therefore iridescent diffraction light is not observed.

As such, iridescent diffraction light is observed in the first element portion 51, in which the transmissive portions 13 extend parallel to the extension axis of the bar-shaped light source, but iridescent diffraction light is not observed in the second element portion 52, in which the transmissive portions 62 extend perpendicular to the extension axis of the bar-shaped light source.

When the optical element 50 is rotated by 90° about the Z axis, the transmissive portions 62 in the second element portion 52 extend parallel to the extension axis of the bar-shaped light source, and the transmissive portions 13 in the first element portion 51 extends perpendicular to the extension axis of the bar-shaped light source. Consequently, in transmitted light observation in which light is incident through the upper transparent plastic layer 15 along the Z axis, iridescent diffraction light is observed in the second element portion 52, but iridescent diffraction light is not observed in the first element portion 51.

Further, in transmitted light observation in which a bar-shaped light source extending along the X axis is positioned on the opposite side of the upper transparent plastic layer 15 from the reflective portions and the light is incident along the Z axis on the optical element 50 shown in FIG. 34, iridescent diffraction light is observed in the second element portion 52, but iridescent diffraction light is not observed in the first element portion 51.

Advantages of the optical element of the fourth embodiment will now be described.

(10) Since the first area ratio S1 is equal to the second area ratio S2, the state of the scattered light from the first element portion 51 is more likely to be the same as the state of the scattered light from the second element portion 52. Thus, at the side of the optical element 10 where light is reflected, the boundary between the first element portion 51 and the second element portion 52 is difficult to perceive. On the other hand, the transmitted light transmitted through the first element portion 51 differs from the transmitted light transmitted through the second element portion 52. Thus, at the side of the optical element 10 where light is reflected, the number of light rays perceived as being included in the light emanating from the optical element 10 differs from that at the side of the optical element 10 where light is transmitted.

(11) The periodicity axis of the transmission diffraction portion 20 in first element portion 51 is perpendicular to the periodicity axis of the transmission diffraction portion 60 in the second element portion 52. Thus, when the optical element 10 is observed using a bar-shaped light source, the condition in which the diffraction light transmitted through the first element portion 51 is observed differ from the condition in which the diffraction light transmitted through the second element portion 52 is observed.

[Modifications of Fourth Embodiment]

Figure 35:
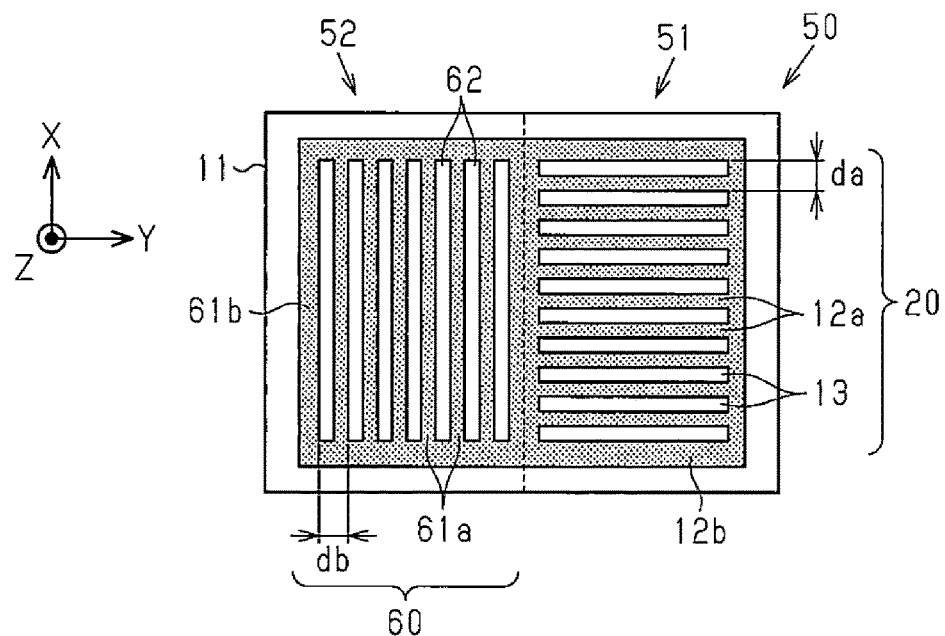
FIG. 35 is a plan view showing the planar structure of the optical element according to a modification of the fourth embodiment as viewed along the Z axis.
Figure 36:
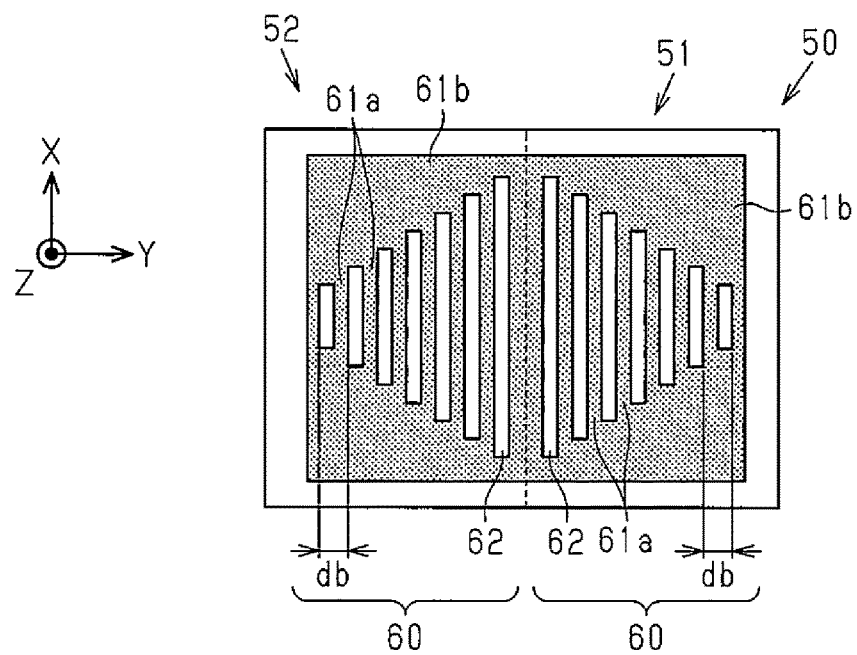
FIG. 36 is a plan view showing the planar structure of the optical element according to a modification of the fourth embodiment as viewed along the Z axis.

The fourth embodiment described above may be modified as follows. In FIGS. 35 and 36 described below, for the sake of convenience in explanation of the reflective portions and transmissive portions of the optical element, the upper transparent plastic layer is not shown, and the reflective portions are shaded with dots.

At least one of the set of the reflective portions 12 in the first element portion 51 and the set of the reflective portions 61 in the second element portion 52 may be defined by cylindrical surfaces. That is, the structure of the first element portion 51 may be combined with the reflective portions 31 of the second embodiment, and the structure of the second element portion 52 may be combined with the reflective portion 31 of the second embodiment. Alternatively, the reflective portions 12 in the first element portion 51 may include both reflective portions having the non-periodic uneven structures described above and reflective portions defined by cylindrical surfaces. The reflective portions 61 in the second element portion 52 may include both reflective portions having the non-periodic uneven structures described above and reflective portions defined by cylindrical surfaces.

Further, the reflective portions 12 in the first element portion 51 may include periodic uneven structures, and the reflective portions 61 in the second element portion 52 may also include periodic uneven structures. That is, in an optical element, the structure of the first element portion 51 may be combined with the reflective portions 41 of the third embodiment, and the structure of the second element portion 52 may be combined with the reflective portion 41 of the third embodiment.

With such a structure, the diffraction light resulting from the periodic uneven structures of the reflective portions and the diffraction light resulting from the grating period of the transmission diffraction portion are observed in reflected light observation. In transmitted light observation, however, only the diffraction light transmitted through the transmission diffraction portion is observed. Thus, in the optical element 50, the grating period of the reflective portions and the grating period of the transmission diffraction portion may be set such that the wavelengths of the two diffraction light rays are combined and iridescent diffraction light is not observed in reflected light observation. Further, the grating period of the reflective portions and the grating period of the transmission diffraction portion may be set such that properties including transmission angle and wavelengths of the two diffraction light rays are significantly different, allowing the two diffraction light rays to be observed in vivid colors.

When the reflective portions 12 in the first element portion 51 and the reflective portions 61 in the second element portion 52 have periodic uneven structures and reflect diffraction light, the grating period of the reflective portions 12 in the first element portion 51 may be the same as or different from the grating period of the reflective portions 61 in the second element portion 52. Further, the periodicity axis of the reflective portions 12 in first element portion 51 may be the same as or different from the periodicity axis of the reflective portions 61 in the second element portion 52.

In a structure in which the grating period of the reflective portions 12 in the first element portion 51 differs from the grating period of the reflective portions 61 in the second element portion 52, and in a structure in which the periodicity axis of the reflective portions 12 in the first element portion 51 differs from the periodicity axis of the reflective portions 61 in the second element portion 52, the optical element 50 may be structured such that the diffraction light produced by the first element portion 51 as reflection light and the diffraction light produced by the second element portion 52 as reflection light are combined and emanate as white reflection light from the optical element 50.

When the reflective portions 12 in the first element portion 51 and the reflective portions 61 in the second element portion 52 have the periodic uneven structures and reflect diffraction light, at least one of the first element portion 51 and the second element portion 52 may include multiple kinds of reflective portions that differ from one another in at least one of the periodicity axis and the grating period in the uneven structure.

Further, one of the set of reflective portions 12 in the first element portion 51 and the set of reflective portions 61 in the second element portion 52 may include non-periodic uneven structures or cylindrical surfaces and reflect scattered light, and the other may include periodic uneven structures and reflect diffraction light.

As shown in FIG. 35, the positions of the reflective portions and transmissive portions in FIG. 34 may be inverted. In other words, the optical element 50 includes a single metal film formed over the lower transparent plastic layer 11, that is, on the back surface 15r of the upper transparent plastic layer 15. The single metal film extends over both the first and second element portions 51 and 52.

The first element portion 51 includes a plurality of transmissive portions 13 arranged at equal intervals along the X axis. Each transmissive portion 13 is shaped like a strip extending along the Y axis. Each of reflective portions 12a is located between corresponding two transmissive portions 13 that are adjacent to each other along the X axis.

The reflective portions 12a and the transmissive portions 13 are arranged successively and alternately along the X axis and form a transmission diffraction portion 20, which has a predetermined grating period da. In the first element portion 51, the section of the metal film surrounding the transmissive portions 13 also serves as a reflective portion 12b.

The second element portion 52 includes a plurality of transmissive portion 62 arranged at equal intervals along the Y axis. Each transmissive portion 62 is shaped like a strip extending along the X axis. Each of reflective portions 61a is located between corresponding two transmissive portions 62 that are adjacent to each other along the Y axis.

The reflective portions 61a and the transmissive portions 62 are arranged successively and alternately along the Y axis and form a transmission diffraction portion 60, which has a predetermined grating period db. The grating period db in the second element portion 52 is equal to the grating period da in the first element portion 51. In the second element portion 52, the section of the metal film surrounding the transmissive portions 62 also serves as a reflective portion 61b.

The surface of the metal film of the optical element 50 includes non-periodic uneven structures that are identical in properties. That is, the reflective portions in the first element portion 51 and the reflective portions in the second element portion 52 are identical in properties of their non-periodic uneven structures. Thus, the scattered light produced by the reflective portions 12 in the first element portion 51 as reflection light is identical with the scattered light produced by the reflective portions 61 in the second element portion 52 as reflection light.

Such an optical element 50 has the same advantages as the optical element 50 of the fourth embodiment.

In the optical element 50 shown in FIG. 35, the section of the metal film corresponding to the first element portion 51 may differ from the section of the metal film corresponding to the second element portion 52 in properties of their non-periodic uneven structures. That is, the non-periodic uneven structure of the transmission diffraction portion 20 including the reflective portions in the first element portion 51 may differ from the non-periodic uneven structure of the transmission diffraction portion 60 including the reflective portions in the second element portion 52.

In this structure, the two transmission diffraction portions have different non-periodic uneven structures, thereby producing different reflection light rays.

In the optical element 50 shown in FIG. 35, the metal film may include a periodic uneven structure and produce diffraction light as reflection light from the light incident on the optical element 50. That is, each of reflective portions in the first uneven structure 51 and the reflective portions in the second element portion 52 may have a periodic uneven structure. The section of the metal film corresponding to the first element portion 51 may be the same or different from the section of the metal film corresponding to the second element portion 52 in properties of the periodic uneven structure. That is, the reflective portions in the first element portion 51 may be the same as or different from the reflective portions in the second element portion 52 in properties of periodic uneven structure.

The optical element 50 shown in FIG. 36 differs from the optical element 50 shown in FIG. 35 in that the transmissive portions 62 in the second element portion 52 have different lengths along the X axis. For example, the lengths along the X axis of the transmissive portions 62 gradually decrease from the transmissive portion 62 located at one end on the Y axis toward the transmissive portion 62 located at the other end. The first element portion 51 and the second element portion 52 are symmetric about a Z-X plane extending along the boundary between the first element portion 51 and the second element portion 52.

Alternatively, the transmissive portions 62 in the second element portion 52 may include transmissive portions 62 of different lengths along the X axis, and the transmissive portions 62 may be arranged along the Y axis without a predetermined regularity in length along the X axis.

In such a structure, the reflective portions in the first and second element portions 51 and 52 may have non-periodic uneven structures and scatter incident light, and the reflective portions in the first element portion 51 may be the same as or different from the reflective portions in the second element portion 52 in properties of their non-periodic uneven structures. Alternatively, the reflective portions in the first and second element portions 51 and 52 may have periodic uneven structures and diffract incident light, and the reflective portions in the first element portion 51 may be the same as or different from the reflective portions in the second element portion 52 in properties of their periodic uneven structures.

In the optical element 50, the reflective portions 12 in the first element portion 51 may have different lengths along the Y axis, and the reflective portions 61 in the second element portion 52 may have different lengths along the Y axis. That is, the structure of the optical element 50 may be combined with the optical element 10 shown in FIG. 13, which is a modification of the first embodiment.

In the optical element 50, the structure of the first element portion 51 in the optical element 50 shown in FIG. 34 may be combined with the structure of the second element portion 52 in the optical element 50 shown in FIG. 35. Alternatively, the structure of the second element portion 52 in the optical element 50 shown in FIG. 34 may be combined with the structure of the first element portion 51 in the optical element 50 shown in FIG. 35.

In the optical element 50, the transmission diffraction portion in the first element portion 51 may be identical with the transmission diffraction portion in the second element portion 52, and the non-periodic uneven structure of the reflective portions in the first element portion 51 may differ from the non-periodic uneven structure of the reflective portions in the second element portion 52. This structure allows the optical effect obtained by the first element portion 51 to be different from the optical effect obtained by the second element portion 52.

In the optical element, the transmission diffraction portion in the first element portion 51 may be equal to the transmission diffraction portion in the second element portion 52, and the periodic uneven structure of the reflective portions in the first element portion 51 may differ from the periodic uneven structure of the reflective portions in the second element portion 52 in the grating period in the reflection periodic portions. This structure allows the optical effect obtained by the first element portion 51 to be different from the optical effect obtained by the second element portion 52.

When the grating period of the reflective portions in the first element portion 51 differs from the grating period of the reflective portions in the second element portion 52, the transmission diffraction portions can produce different diffraction light rays.

[Fifth Embodiment]

Figure 37:
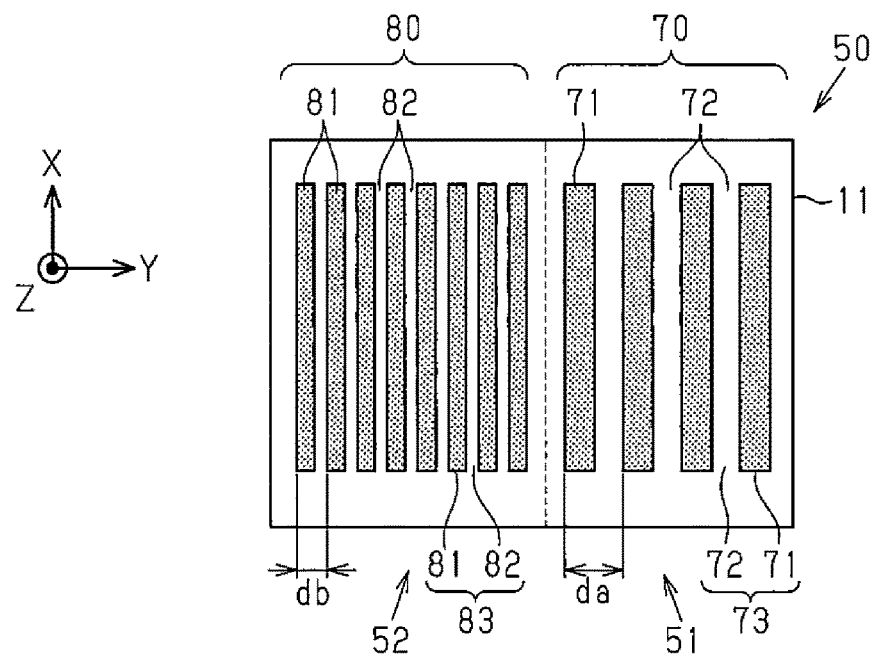
FIG. 37 is a plan view showing the planar structure of the optical element according to a fifth embodiment of the present invention as viewed along the Z axis.

Referring to FIG. 37, an optical element according to a fifth embodiment will now be described. The optical element of the fifth embodiment differs from the optical element of the fourth embodiment in that the grating period of the transmission diffraction portion in the first element portion differs from the grating period of the transmission diffraction portion in the second element portion. Thus, the following descriptions will focus on this difference. Same reference numerals are given to those components that are the same as the corresponding components of the optical element of the fourth embodiment. Such components will not be described in detail. In the following descriptions, the structure of the optical element and the operation of the optical element are described in this order.

[Structure of Optical Element]

Referring to FIG. 37, the structure of the optical element will now be described. In FIG. 37, for the sake of convenience in explanation of the reflective portions and transmissive portions of the optical element, the upper transparent plastic layer is not shown, and the reflective portions are shaded with dots.

As shown in FIG. 37, an optical element 50 includes a first element portion 51 and a second element portion 52. The first element portion 51 includes a plurality of reflective portions 71 arranged at equal intervals along the Y axis, which is an example of a given axis. Each reflective portion 71 is shaped like a strip extending along the X axis. Each of transmissive portions 72 is located between corresponding two reflective portions 71 that are adjacent to each other along the Y axis. The transmissive portions 72 are arranged at equal intervals along the Y axis. Each transmissive portion 72 is shaped like a strip extending along the X axis. Each reflective portion 71 has a non-periodic uneven structure. In the first element portion 51, the ratio between the sum of areas of all reflective portions 71 and the sum of areas of sections that transmit light, including the transmissive portions 72, is a first area ratio S1.

The reflective portions 71 and the transmissive portions 72 are arranged successively and alternately along the Y axis and form a transmission diffraction portion 70. In the transmission diffraction portion 70, a reflective portion 71 and a transmissive portion 72 that are adjacent to each other form a transmission periodic portion 73, which has a predetermined grating period da.

The second element portion 52 includes a plurality of reflective portions 81 arranged at equal intervals along the Y axis. Each reflective portion 81 is shaped like a strip extending along the X axis. Each of transmissive portions 82 is located between corresponding two reflective portions 81 that are adjacent to each other along the Y axis. The transmissive portions 82 are arranged at equal intervals along the Y axis. Each transmissive portion 82 is shaped like a strip extending along the X axis. Each reflective portion 81 has a non-periodic uneven structure that is identical in properties with the reflective portions 71 in the first element portion 51. In the second element portion 52, the ratio between the sum of areas of all reflective portions 81 and the sum of areas of sections that transmit light, including the transmissive portions 82, is a second area ratio S2.

The reflective portions 81 and the transmissive portions 82 are arranged successively and alternately along the Y axis and form a transmission diffraction portion 80. In the transmission diffraction portion 80, a reflective portion 81 and a transmissive portion 82 that are adjacent to each other form a transmission periodic portion 83, which has a predetermined grating period db. The grating period db of the transmission diffraction portion 80 in the second element portion 52 is less than the grating period da of the transmission diffraction portion 70 in the first element portion 51. Alternatively, the grating period db of the transmission diffraction portion 80 in the second element portion 52 may be greater than the grating period da of the transmission diffraction portion 70 in the first element portion 51.

[Operation of Optical Element]

When the first area ratio S1 is equal to the second area ratio S2 in the optical element 50, the intensity of the scattered light reflected by the first element portion 51 is equal to the intensity of the scattered light reflected by the second element portion 52. Further, the reflective portions 71 in the first element portion 51 are identical with the reflective portions 81 in the second element portion 52 in properties of their non-periodic uneven structures. Thus, the boundary between the first element portion 51 and the second element portion 52 is not easily perceived in reflected light observation.

On the other hand, the grating period da of the transmission diffraction portion 70 in the first element portion 51 differs from the grating period db of the transmission diffraction portion 80 in the second element portion 52. Thus, the diffraction light produced as transmitted light from incident light by the transmission diffraction portion 70 in the first element portion 51 differs from the diffraction light produced as transmitted light from incident light by the transmission diffraction portion 80 in the second element portion 52. As a result, in transmitted light observation, the diffraction light observed in the first element portion 51 differs from the diffraction light observed in the second element portion 52 in transmission angle and dispersion angle, allowing the boundary between the first element portion 51 and the second element portion 52 to be easily perceived.

An advantage of the optical element of the fifth embodiment will now be described.

(12) Since the grating period of the transmission diffraction portion 70 in the first element portion 51 differs from the grating period of the transmission diffraction portion 80 in the second element portion 52, the transmission diffraction portions produce different diffraction light rays.

[Modifications of Fifth Embodiment]

Figure 38:
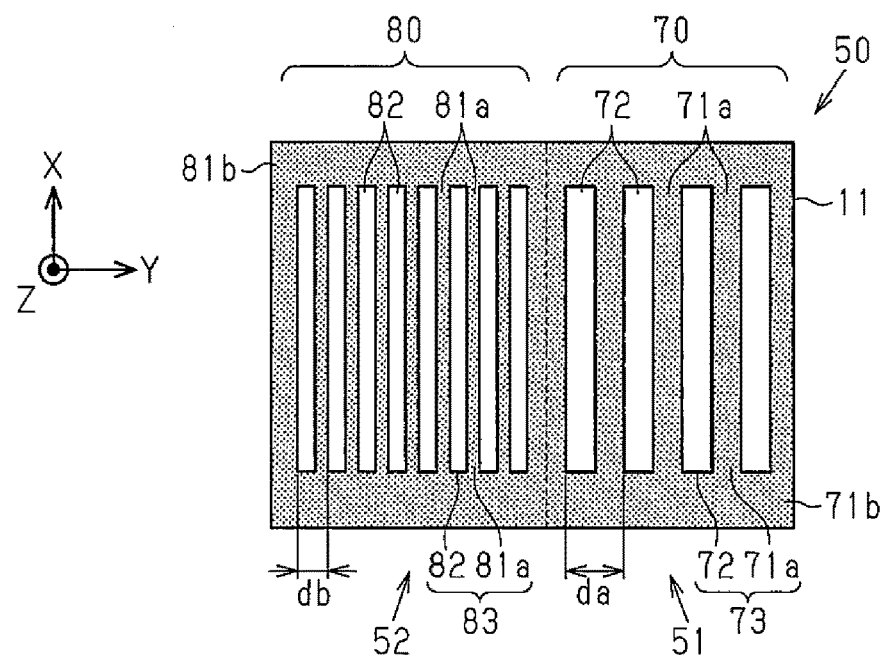
FIG. 38 is a plan view showing the planar structure of the optical element according to a modification of the fifth embodiment as viewed along the Z axis.
Figure 39:
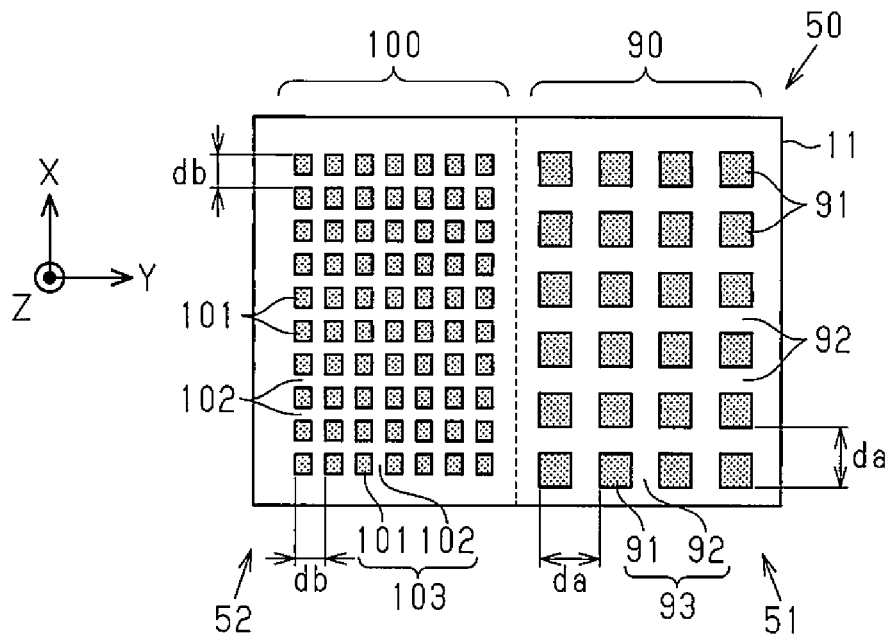
FIG. 39 is a plan view showing the planar structure of the optical element according to a modification of the fifth embodiment as viewed along the Z axis.
Figure 40:
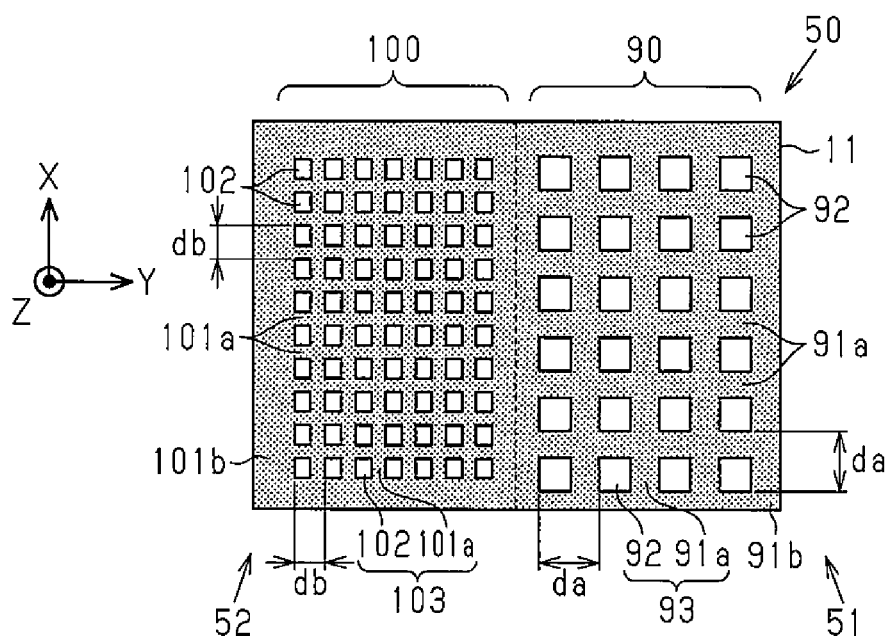
FIG. 40 is a plan view showing the planar structure of the optical element according to a modification of the fifth embodiment as viewed along the Z axis.

The fifth embodiment described above may be modified as follows. In FIGS. 38 to 40 described below, for the sake of convenience in explanation of the reflective portions and transmissive portions of the optical element, the upper transparent plastic layer is not shown, and the reflective portions are shaded with dots.

The first area ratio S1 in the first element portion 51 may differ from the second area ratio S2 in the second element portion 52.

Instead of the non-periodic uneven structure, the reflective portions 71 in the first element portion 51 and the reflective portions 81 in the second element portion 52 may have periodic uneven structures and produce diffraction light as reflection light. In such a structure, as long as the reflective portions 71 in the first element portion 51 are identical with the reflective portions 81 in the second element portion 52 in properties of their periodic uneven structures, the diffraction light produced by the first element portion 51 as reflection light is identical with the diffraction light produced by the second element portion 52 as reflection light. As such, the boundary between the first element portion 51 and the second element portion 52 is difficult to perceive.

As shown in FIG. 38, the positions of the reflective portions and transmissive portions of the optical element 50 shown in FIG. 37 may be inverted. That is, the optical element 50 includes a single metal film formed over the lower transparent plastic layer 11, that is, on the back surface 15r of the upper transparent plastic layer 15. The single metal film extends over both the first and second element portions 51 and 52.

The first element portion 51 includes a plurality of transmissive portion 72 arranged at equal intervals along the Y axis. Each transmissive portion 72 is shaped like a strip extending along the X axis. Each of reflective portions 71a is located between corresponding two transmissive portions 72 that are adjacent to each other along the Y axis.

The reflective portions 71a and the transmissive portions 72 are arranged successively and alternately along the Y axis and form a transmission diffraction portion 70. In the transmission diffraction portion 70, a reflective portion 71a and a transmissive portion 72 that are adjacent to each other form a transmission periodic portion 73, which has a predetermined grating period da. In the first element portion 51, the section of the metal film surrounding the transmissive portions 72 also serves as a reflective portion 71b.

The second element portion 52 includes a plurality of transmissive portions 82 arranged at equal intervals along the Y axis. Each transmissive portion 82 is shaped like a strip extending along the X axis. Each of reflective portions 81a is located between corresponding two transmissive portions 82 that are adjacent to each other along the Y axis.

The reflective portions 81a and the transmissive portions 82 are arranged successively and alternately along the Y axis and form a transmission diffraction portion 80. In the transmission diffraction portion 80, a reflective portion 81a and a transmissive portion 82 that are adjacent to each other form a transmission periodic portion 83, which has a predetermined grating period db. The grating period db in the second element portion 52 is less than the grating period da in the first element portion 51. In the second element portion 52, the section of the metal film surrounding the transmissive portions 82 also serves as a reflective portion 81b.

Such a structure has the same advantages as the optical element 50 of the fifth embodiment.

As shown in FIG. 39, the optical element 50 may have a cross-grating structure. The optical element 50 includes a first element portion 51 and a second element portion 52. In the first element portion 51, a plurality of rectangular reflective portions 91 is arranged at equal intervals along the X axis and arranged at equal intervals along the Y axis. Transmissive portions 92 extend along the Y axis and are located between respective two reflective portions 91 that are adjacent to each other along the X axis. In addition, transmissive portions 92 extend along the X axis and are located between respective two reflective portions 91 that are adjacent to each other along the Y axis.

The reflective portions 91 and the transmissive portions 92 are arranged successively and alternately along the X axis and arranged successively and alternately along the Y axis. A plurality of reflective portions 91 and a plurality of transmissive portions 92 thus form a transmission diffraction portion 90. Further, a reflective portion 91 and a transmissive portion 92 that are adjacent to each other along the X axis form a transmission periodic portion 93, and a reflective portion 91 and a transmissive portion 92 that are adjacent to each other along the Y axis form a transmission periodic portion 93. In the transmission diffraction portion 90, the grating period along the periodicity axis that is parallel to the X axis is equal to the grating period along the periodicity axis that is parallel to the Y axis, and each grating period is a predetermined grating period da.

In the second element portion 52, a plurality of rectangular reflective portions 101 is arranged at equal intervals along the X axis and arranged at equal intervals along the Y axis. Transmissive portions 102 extend along the Y axis and are located between respective two reflective portions 101 that are adjacent to each other along the X axis. In addition, transmissive portions 102 extend along the X axis and are located between respective two reflective portions 101 that are adjacent to each other along the Y axis.

The reflective portions 101 and the transmissive portion 102 are arranged successively and alternately along the X axis and arranged successively and alternately along the Y axis. A plurality of reflective portions 101 and a plurality of transmissive portions 102 thus form a transmission diffraction portion 100. Further, a reflective portion 101 and a transmissive portion 102 that are adjacent to each other along the X axis form a transmission periodic portion 103, and a reflective portion 101 and a transmissive portion 102 that are adjacent to each other along the Y axis form a transmission periodic portion 103. In the transmission diffraction portion 100, the grating period along the periodicity axis that is parallel to the X axis is equal to the grating period along the periodicity axis that is parallel to the Y axis, and each grating period is a predetermined grating period db. The grating period db of the transmission diffraction portion 100 in the second element portion 52 is less than the grating period da of the transmission diffraction portion 90 in the first element portion 51.

In such an optical element 50, the boundary between the first element portion 51 and the second element portion 52 is not easily perceived in reflected light observation. However, in the transmitted light observation, the boundary between the first element portion 51 and the second element portion 52 can be easily perceived since the diffraction light resulting from transmission through the first element portion 51 differs from the diffraction light resulting from transmission through the second element portion 52.

As shown in FIG. 40, in the optical element 50, the positions of the reflective portions and transmissive portions in FIG. 39 may be inverted. That is, the optical element 50 includes a single metal film formed over the lower transparent plastic layer 11, that is, on the back surface 15r of the upper transparent plastic layer 15. The single metal film extends over both the first and second element portions 51 and 52.

In the first element portion 51, a plurality of rectangular transmissive portion 92 is arranged at equal intervals along the X axis and arranged at equal intervals along the Y axis. Reflective portions 91a extend along the Y axis and are located between respective two transmissive portions 92 that are adjacent to each other along the X axis. In addition, reflective portions 91a extend along the X axis and are located between respective two transmissive portions 92 that are adjacent to each other along the Y axis. The section of the metal film surrounding the transmissive portions 92 also serves as a reflective portion 91b.

The reflective portions 91a and the transmissive portion 92 are arranged successively and alternately along the X axis and arranged successively and alternately along the Y axis. A plurality of reflective portions 91a and a plurality of transmissive portions 92 thus form a transmission diffraction portion 90. Further, a reflective portion 91a and a transmissive portion 92 that are adjacent to each other along the X axis form a transmission periodic portion 93, and a reflective portion 91a and a transmissive portion 92 that are adjacent to each other along the Y axis form a transmission periodic portion 93. In the transmission diffraction portion 90, the grating period along the periodicity axis that is parallel to the X axis is equal to the grating period along the axis that is parallel to the Y axis, and each grating period is a predetermined grating period da.

In the second element portion 52, a plurality of rectangular transmissive portion 102 is arranged at equal intervals along the X axis and arranged at equal intervals along the Y axis. Reflective portions 101a extend along the Y axis and are located between respective two transmissive portions 102 that are adjacent to each other along the X axis. In addition, reflective portions 101a extend along the X axis and are located between respective two transmissive portions 102 that are adjacent to each other along the Y axis. The section of the metal film surrounding the transmissive portions 92 also serves as a reflective portion 101b.

The reflective portions 101a and the transmissive portions 102 are arranged successively and alternately along the X axis and arranged successively and alternately along the Y axis. A plurality of reflective portions 101 and a plurality of transmissive portions 102 thus form a transmission diffraction portion 100. Further, a reflective portion 101a and a transmissive portion 102 that are adjacent to each other along the X axis form a transmission periodic portion 103, and a reflective portion 101a and a transmissive portion 102 that are adjacent to each other along the Y axis form a transmission periodic portion 103. In the transmission diffraction portion 100, the grating period along the periodicity axis that is parallel to the X axis is equal to the grating period along the axis that is parallel to the Y axis, and each grating period is a predetermined grating period db. The grating period db of the transmission diffraction portion 100 in the second element portion 52 is less than the grating period da of the transmission diffraction portion 90 in the first element portion 51.

Such a structure has the similar advantages as the optical element 50 shown in FIG. 39.

The optical element 50 may be combined with the structure of the fourth embodiment. That is, the periodicity axis of the transmission diffraction portion 70 in first element portion 51 may differ from the periodicity axis of the transmission diffraction portion 80 in the second element portion 52.

[Sixth Embodiment]

Figure 41:
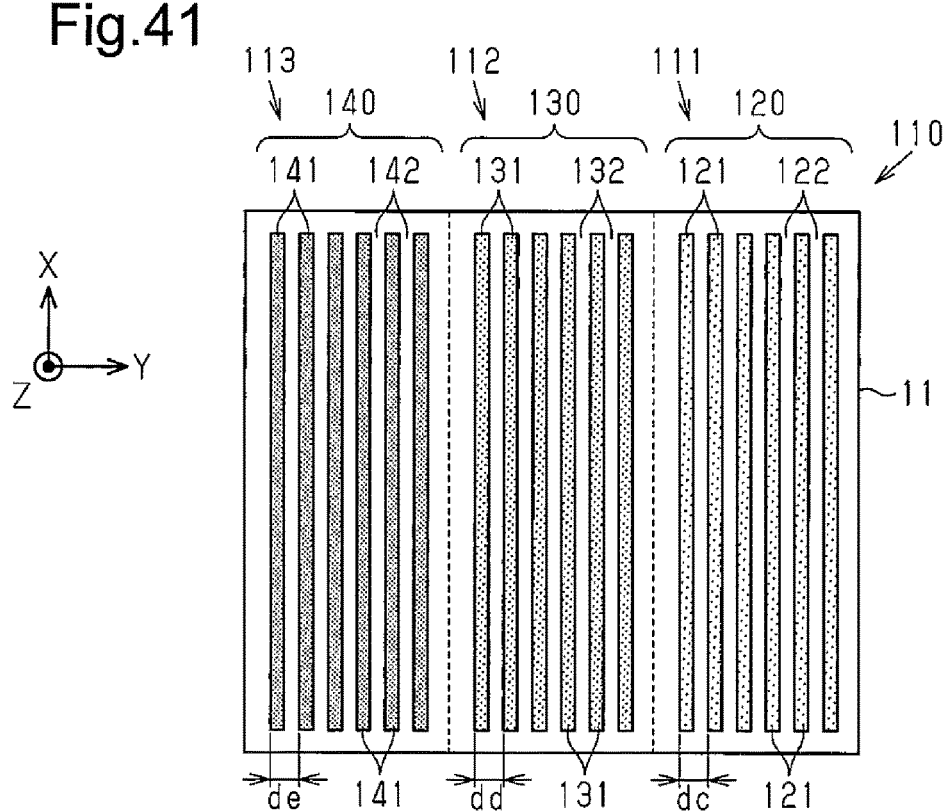
FIG. 41 is a plan view showing the planar structure of the optical element according to a sixth embodiment of the present invention as viewed along the Z axis.

Referring to FIG. 41, an optical element according to a sixth embodiment will now be described. The optical element of the sixth embodiment differs from the optical element of the fourth embodiment in the number of element portions that form one optical element. Thus, the following descriptions will focus on this difference. Same reference numerals are given to those components that are the same as the corresponding components of the optical element of the fourth embodiment. Such components will not be described in detail. In the following descriptions, the structure of the optical element and the operation of the optical element are described in this order.

[Structure of Optical Element]

Referring to FIG. 41, the structure of the optical element will now be described. In FIG. 41, for the sake of convenience in explanation of the reflective portions and transmissive portions of the optical element, the upper transparent plastic layer is not shown, and the reflective portions are shaded with dots.

As shown in FIG. 41, an optical element 110 includes a first element portion 111, a second element portion 112, and a third element portion 113, which are defined on the lower transparent plastic layer 11. The first element portion 111 includes a plurality of reflective portions 121 arranged at equal intervals along the Y axis. Each reflective portion 121 is shaped like a strip extending along the X axis. Each of transmissive portions 122 is located between corresponding two reflective portions 121 that are adjacent to each other along the Y axis. Each transmissive portion 122 is shaped like a strip extending along the X axis. The reflective portions 121 and the transmissive portions 122 are arranged successively and alternately along the Y axis and form a transmission diffraction portion 120, which has a predetermined grating period dc. Each reflective portion 121 has a periodic uneven structure and produces red diffraction light as reflection light, for example.

In the similar manner as the first element portion 111, the second element portion 112 includes a plurality of reflective portions 131 arranged at equal intervals along the Y axis.

Each reflective portion 131 is shaped like a strip extending along the X axis. Each of transmissive portions 132 is located between corresponding two reflective portions 131 that are adjacent to each other along the Y axis. Each transmissive portion 132 is shaped like a strip extending along the X axis. The reflective portions 131 and the transmissive portions 132 are arranged successively and alternately along the Y axis and form a transmission diffraction portion 130, which has a predetermined grating period dd.

Each reflective portion 131 has a periodic uneven structure that differs in properties from the periodic uneven structure of the reflective portion 121 in the first element portion 111. The reflective portion 131 produces green diffraction light as reflection light, for example.

In the similar manner as the first element portion 111, the third element portion 113 includes a plurality of reflective portions 141 arranged at equal intervals along the Y axis. Each reflective portion 141 is shaped like a strip extending along the X axis. Each of transmissive portions 142 is located between corresponding two reflective portions 141 that are adjacent to each other along the Y axis. Each transmissive portion 142 is shaped like a strip extending along the X axis. The reflective portions 141 and the transmissive portions 142 are arranged successively and alternately along the Y axis and form a transmission diffraction portion 140, which has a predetermined grating period de. The grating period de in the third element portion 113, the grating period dc in the first element portion 111, and the grating period dd in the second element portion 112 are the same. However, the grating periods in the three element portions do not have to be the same.

Each reflective portion 141 has a periodic uneven structure that differs in properties from both of the uneven structure of the reflective portion 121 in the first element portion 111 and the uneven structure of the reflective portion 131 in the second element portion 112. The reflective portion 141 produces blue diffraction light as reflection light, for example.

[Operation of Optical Element]

When light is incident on the transmission diffraction portions of the optical element 110 through the upper transparent plastic layer 15, the first element portion 111 produces red diffraction light as reflection light, the second element portion 112 produces green diffraction light as reflection light, and the third element portion 113 produces blue diffraction light as reflection light. The reflection light emanating from the optical element 50 is a mixture of three diffraction light rays and is thus white light.

As such, the optical element 50 is able to produce white reflection light without including the reflective portions that have non-periodic uneven structures and reflect scattered light, or the reflective portions that have cylindrical surfaces and reflect scattered light.

An advantage of the optical element of the sixth embodiment will now be described.

(13) The three element portions of the optical element 110 have mutually different periodic uneven structures and thus produce mutually different diffraction light rays as reflection light. Thus, the optical element 110 emits white reflection light.

[Modifications of Sixth Embodiment]

Figure 42:
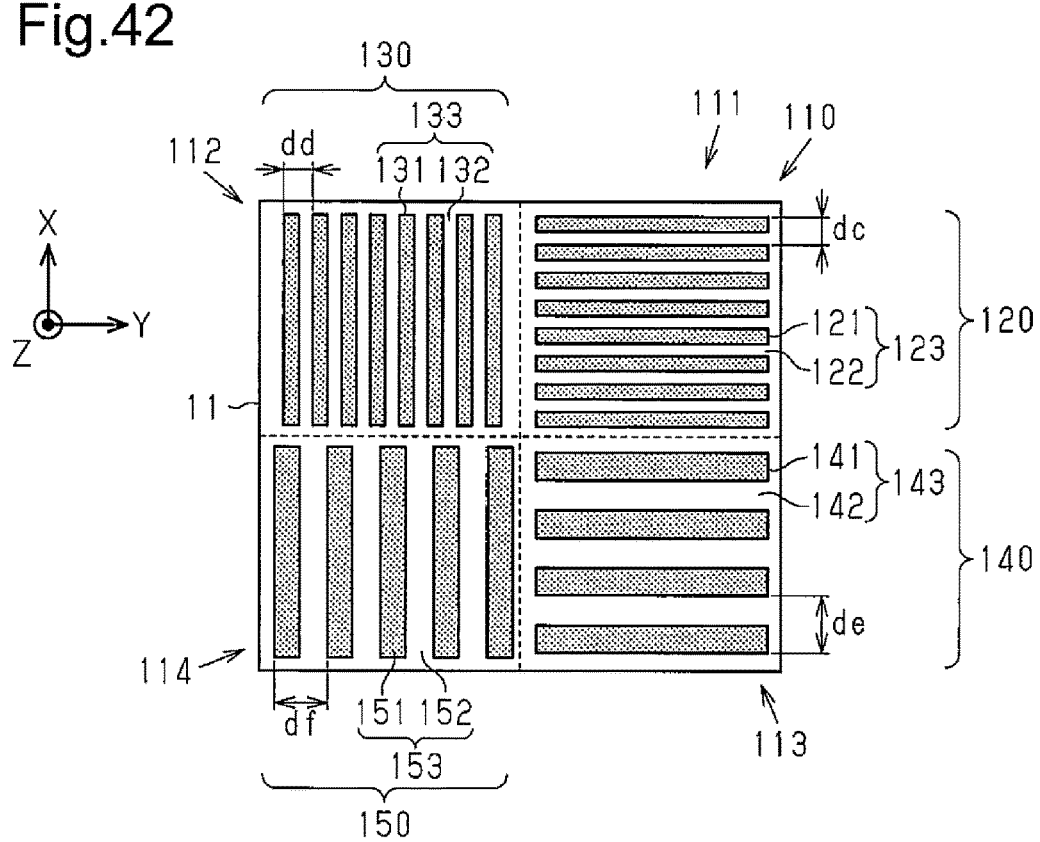
FIG. 42 is a plan view showing the planar structure of the optical element according to a modification of the sixth embodiment as viewed along the Z axis.

The sixth embodiment described above may be modified as follows. In FIG. 42 described below, the upper transparent plastic layer is not shown for the sake of convenience in explanation of the reflective portions and transmissive portions of the optical element.

The optical element 110 is not limited to a structure in which white reflection light is produced by combining diffraction light rays. It is sufficient that the optical element 50 include three element portions that differ from one another in at least one of optical effect resulting from reflection and optical effect resulting from transmission.

As long as the optical element 110 includes three or more element portions, the number of element portions is not limited. For example, the optical element 110 may include four element portions. As shown in FIG. 42, an optical element 110 may include a first element portion 111, a second element portion 112, a third element portion 113, and a fourth element portion 114, which are defined on the lower transparent plastic layer 11. The first element portion 111 includes a plurality of reflective portion 121 arranged at equal intervals along the X axis. Each reflective portion 121 is shaped like a strip extending along the Y axis. In the first element portion 111, each of transmissive portions 122 is located between corresponding two reflective portions 121 that are adjacent to each other along the X axis. Each transmissive portion 122 is shaped like a strip extending along the Y axis.

The reflective portions 121 and the transmissive portions 122 are arranged successively and alternately along the X axis and form a transmission diffraction portion 120. In the transmission diffraction portion 120, a reflective portion 121 and a transmissive portion 122 that are adjacent to each other form a transmission periodic portion 123, which has a predetermined grating period dc.

The second element portion 112 includes a plurality of reflective portions 131 arranged at equal intervals along the Y axis. Each reflective portion 131 is shaped like a strip extending along the X axis. In the second element portion 112, each of transmissive portions 132 is located between corresponding two reflective portions 131 that are adjacent to each other along the Y axis. Each transmissive portion 132 is shaped like a strip extending along the X axis.

The reflective portions 131 and the transmissive portions 132 are arranged successively and alternately along the Y axis and form a transmission diffraction portion 130. In the transmission diffraction portion 130, a reflective portion 131 and a transmissive portion 132 that are adjacent to each other form a transmission periodic portion 133, which has a predetermined grating period dd. The grating period dd is equal to the grating period dc of the transmission diffraction portion 120 in the first element portion 111. The periodicity axis of the transmission diffraction portion 130 in the second element portion 112 is perpendicular to the periodicity axis of the transmission diffraction portion 120 in the first element portion 111.

The third element portion 113 includes a plurality of reflective portions 141 arranged at equal intervals along the X axis. Each reflective portion 141 is shaped like a strip extending along the Y axis. In the third element portion 113, each of transmissive portions 142 is located between corresponding two reflective portions 141 that are adjacent to each other along the X axis. Each transmissive portion 142 is shaped like a strip extending along the Y axis.

The reflective portions 141 and the transmissive portions 142 are arranged successively and alternately along the X axis and form a transmission diffraction portion 140. In the transmission diffraction portion 140, a reflective portion 141 and a transmissive portion 142 that are adjacent to each other form a transmission periodic portion 143, which has a predetermined grating period de. The grating period de of the transmission diffraction portion 140 is greater than both of the grating period dc of the transmission diffraction portion 120 in the first element portion 111 and the grating period dd of the transmission diffraction portion 130 in the second element portion 112.

The fourth element portion 114 includes a plurality of reflective portions 151 arranged at equal intervals along the Y axis. Each reflective portion 151 is shaped like a strip extending along the X axis. In the fourth element portion 114, each of transmissive portions 152 is located between corresponding two reflective portions 151 that are adjacent to each other along the Y axis. Each transmissive portion 152 is shaped like a strip extending along the X axis.

The reflective portions 151 and the transmissive portions 152 are arranged successively and alternately along the Y axis and form a transmission diffraction portion 150. In the transmission diffraction portion 150, a reflective portion 151 and a transmissive portion 152 that are adjacent to each other form a transmission periodic portion 153, which has a predetermined grating period df. The grating period df is equal to the grating period de of the transmission diffraction portion 140 in the third element portion 113. The periodicity axis of the transmission diffraction portion 150 in the fourth element portion 114 is perpendicular to the periodicity axis of the transmission diffraction portion 140 in the third element portion 113.

Each reflective portion in each element portion is one of: a reflective portion that has a non-periodic uneven structure and produces scattered light as reflection light; a reflective portion that has a cylindrical surface and produces scattered light as reflection light; and a reflective portion that has a periodic uneven structure and produces diffraction light as reflection light.

The four element portions of the optical element 50 include element portions that differ from one another in at least one of the periodicity axis and the grating period of the transmission diffraction portion. Thus, different optical effects may be added to the single optical element 50 up to the number of the element portions. By setting the element portions to provide mutually different optical effects in reflected light observation or in transmitted light observation, the optical element 50 can display a plurality of reflection images and a plurality of transmission images using scattered light and diffraction light.

At least one of the three or more element portions of the optical element 110 may have a cross-grating structure.

In the optical element 110 of the sixth embodiment and the modification of the optical element 110 of the sixth embodiment, the positions of the reflective portions and transmissive portions may be inverted. That is, the structure of the optical element 110 of the sixth embodiment and the structure of the optical element 110 of the modification of the sixth embodiment may be combined with the structure of the optical element 10 shown in FIG.

[Seventh Embodiment]

Figure 43:
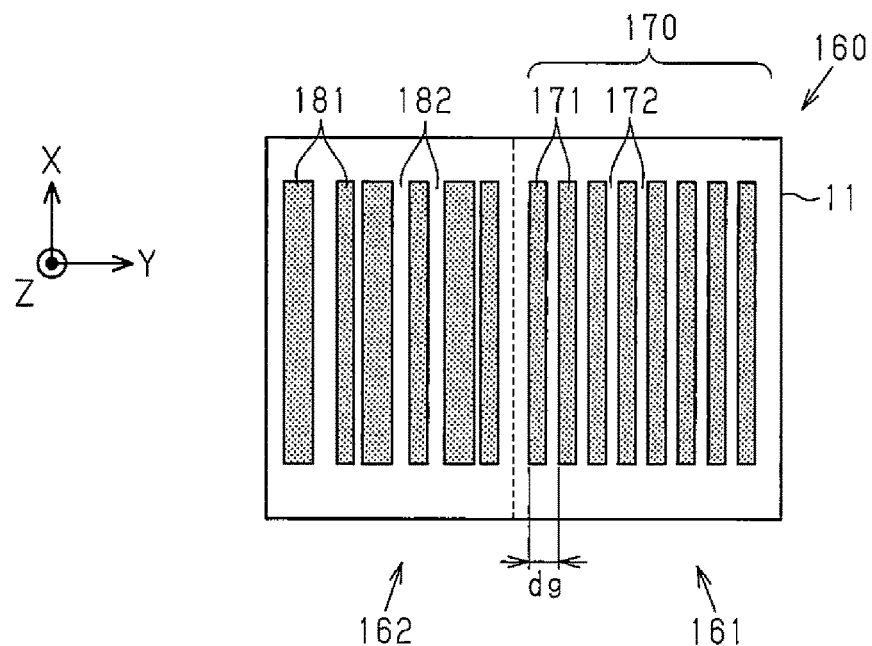
FIG. 43 is a plan view showing the planar structure of the optical element according to a seventh embodiment of the present invention as viewed along the Z axis.

Referring to FIG. 43, an optical element according to a seventh embodiment will now be described. The optical element of the seventh embodiment differs from the optical element of the fourth embodiment in that one of the two element portions forming the optical element does not produce diffraction light as transmitted light. Thus, the following descriptions will focus on this difference. Same reference numerals are given to those components that are the same as the corresponding components of the optical element of the fourth embodiment. Such components will not be described in detail. In the following descriptions, the structure of the optical element and the operation of the optical element are described in this order.

[Structure of Optical Element]

Referring to FIG. 43, the structure of the optical element will now be described. In FIG. 43, for the sake of convenience in explanation of the reflective portions and transmissive portions of the optical element, the upper transparent plastic layer is not shown, and the reflective portions are shaded with dots.

As shown in FIG. 43, an optical element 160 includes a first element portion 161 and a second element portion 162. The first element portion 161 includes a plurality of reflective portion 171 arranged at equal intervals along the Y axis. Each reflective portion 171 is shaped like a strip extending along the X axis. In the first element portion 161, each of transmissive portions 172 is located between corresponding two reflective portions 171 that are adjacent to each other along the Y axis. Each transmissive portion 172 is shaped like a strip extending along the X axis. The reflective portions 171 and the transmissive portions 172 are arranged successively and alternately along the Y axis and form a transmission diffraction portion 170. The transmission diffraction portion 170 has a predetermined grating period dg.

Each reflective portion 171 has a non-periodic uneven structure and produces scattered light as reflection light. The reflective portion 171 may have a cylindrical surface and produce scattered light as reflection light. In the first element portion 161, the ratio between the sum of areas of all reflective portions 171 and the area of section that transmits light, including the transmissive portions 172, is a first area ratio S1.

The second element portion 162 includes a plurality of reflective portions 181 arranged irregularly along the Y axis. Each reflective portion 181 is shaped like a strip extending along the X axis. The reflective portions 181 include reflective portions 181 of different widths along the Y axis. In the second element portion 162, each of transmissive portions 182 is located between corresponding two reflective portions 181 that are adjacent to each other along the Y axis. The transmissive portions 182 include transmissive portions 182 of different widths along the Y axis. Each transmissive portion 182 is shaped like a strip extending along the X axis. The reflective portions 181 and the transmissive portions 182 are arranged successively and alternately along the Y axis. The reflective portion 181 is an example of a scattering portion, and the transmissive portion 182 is an example of a second transmissive portion.

Each reflective portion 181 has a non-periodic uneven structure that is identical in properties with the non-periodic uneven structure of the reflective portions 171 in the first element portion 161 and produces scattered light as reflection light. Alternatively, the reflective portion 181 may have a cylindrical surface and produce scattered light as reflection light. In the second element portion 162, the ratio between the sum of areas of all reflective portions 181 and the area of section that transmits light, including the transmissive portions 182, is a second area ratio S2. The first area ratio S1 is equal to the second area ratio S2.

[Effect of Optical Element]

The non-periodic uneven structure of the reflective portions 171 in the first element portion 161 is identical in properties with the non-periodic uneven structure of the reflective portions 181 in the second element portion 162. Moreover, the first area ratio S1 in the first element portion 161 is equal to the second area ratio S2. Thus, when light is incident on the reflective portions through the upper transparent plastic layer 15, the scattered light from the first element portion 161 is identical with the scattered light from the second element portion 162 in reflected light observation. Thus, the boundary between the first element portion 161 and the second element portion 162 is difficult to perceive. The transmission diffraction portion 170 in the first element portion 161 produces diffraction light as transmitted light, but the second element portion 162 does not produce diffraction light as transmitted light. Consequently, in transmitted light observation, iridescent diffraction light is observed only in the first element portion 161.

An advantage of the optical element of the seventh embodiment will now be described.

(14) The transmitted light transmitted through the first element portion 161 is diffraction light that forms diffraction images that differ from one another in color. In contrast, the light transmitted through the second element portion 162 is white light. This clarifies the difference between the two kinds of transmitted light transmitted through the optical element 160.

[Modifications of Seventh Embodiment]

The seventh embodiment described above may be modified as follows.

The reflective portions 171 in the first element portion 161 and the reflective portions 181 in the second element portion 162 may have periodic uneven structures and produce diffraction light as reflection light. In this structure, as long as the reflective portions 171 in the first element portion 161 are identical in properties with the reflective portions 181 in the second element portion 162, the boundary between the first element portion 161 and the second element portion 162 is not easily perceived in reflected light observation.

In the optical element 160, the positions of the reflective portion 171 in the first element portion 161 and the positions of the transmissive portion 172 in the first element portion 161 may be inverted, and the positions of the reflective portions 181 in the second element portion 162 and the positions of the transmissive portion 182 in the second element portion 162 may be inverted. Such a structure still has the same advantages as the optical element 160 of the seventh embodiment.

Figure 44:
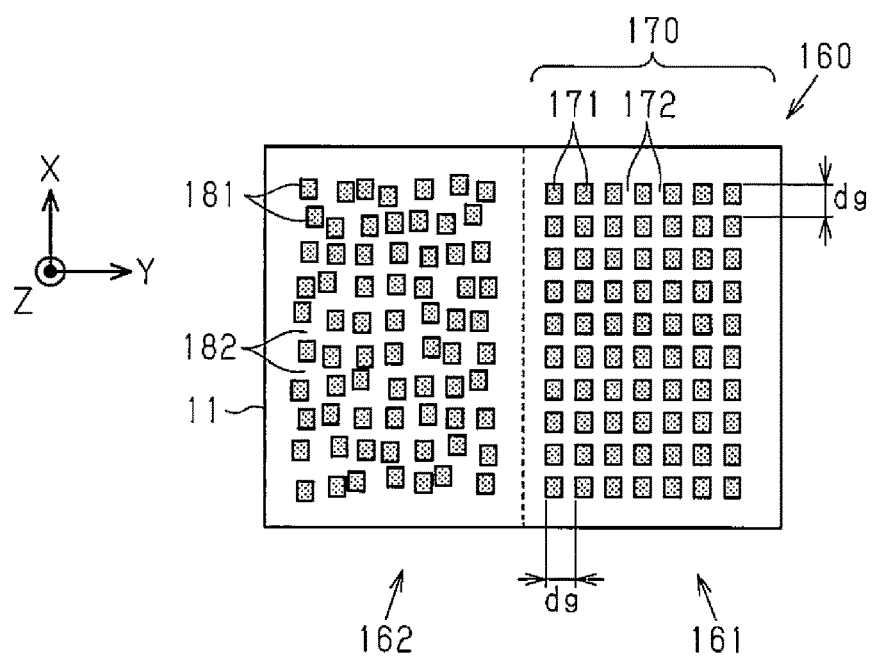
FIG. 44 is a plan view showing the planar structure of the optical element according to a modification of the seventh embodiment as viewed along the Z axis.

The optical element 160 may include a cross-grating structure. That is, as shown in FIG. 44, an optical element 160 includes a first element portion 161 and a second element portion 162. The first element portion 161 includes a plurality of rectangular reflective portions 171 arranged at equal intervals along the X axis and arranged at equal intervals along the Y axis. In the first element portion 161, transmissive portions 172 extend along the Y axis and are located between respective two reflective portions 171 that are adjacent to each other along the X axis. In addition, transmissive portions 172 extend along the X axis and are located between respective two reflective portions 171 that are adjacent to each other along the Y axis.

The reflective portions 171 and the transmissive portions 172 are arranged successively and alternately along the X axis and arranged successively and alternately along the Y axis to forms a transmission diffraction portion 170. The transmission diffraction portion 170 has a predetermined grating period dg in both the periodicity axis that is parallel to the X axis and the periodicity axis that is parallel to the Y axis.

In the second element portion 162, as viewed along the Z axis, a plurality of rectangular reflective portions 181 is arranged irregularly in both of the X and Y axes. In the second element portion 162, transmissive portions 182 are located between respective two reflective portions 181 that are adjacent to each other along the X axis. In addition, transmissive portions 182 are located between respective two reflective portions 181 that are adjacent to each other along the Y axis.

Such a structure still has the same advantages as the optical element 160 of the seventh embodiment.

In the optical element 160 shown in FIG. 44, the positions of the reflective portions 171 and the positions of the transmissive portion 172 in the first element portion 161 may be inverted, and the positions of the reflective portions 181 and the positions of the transmissive portions 182 in the second element portion 162 may be inverted.

EXAMPLES

Example 1

First, as an ultraviolet curable resin, a composition was prepared that included 50.0 parts by mass of the urethane (meth)acrylate, 30.0 parts by mass of methylethyl ketone, 20.0 parts by mass of ethyl acetate, and 1.5 parts by mass of photoinitiator. As the urethane (meth)acrylate, multifunctional urethane (meth)acrylate having a molecular weight of 6000 was used. Irgacure 184 (manufactured by BASF SE) was used as the photoinitiator.

The composition was applied to a transparent PET film having a thickness of 23 μm by gravure printing such that the thickness of the composition film after drying was 1 μm.

Then, an uneven structure was formed in the applied film of the composition using an original plate.

The original plate included a plurality of first regions and a plurality of second regions. The first and second regions were rectangular and had a width of 5 μm along the width axis, which was a given axis, and a width of 20 mm along the length axis, which was perpendicular to the width axis. The first regions and second regions were arranged successively and alternately along the width axis.

Each first region had a non-periodic uneven structure that included a plurality of depressions extending along the length axis and a plurality of projections extending along the length axis. In the non-periodic uneven structure, the depressions and projections were arranged successively and alternately along the width axis in a non-periodic manner. In the non-periodic uneven structure, the average frequency was 100 lines/mm, and the average depth of the depressions was 100 nm.

Each second region had a cross-grating structure in which two periodic uneven structures intersected each other. One of the two periodic uneven structures included a plurality of depressions extending along the length axis and a plurality of projections extending along the length axis. The depressions and projections were arranged alternately and periodically along the width axis. The other uneven structure included a plurality of depressions extending along the width axis and a plurality of projections extending along the width axis. The depressions and projections were arranged alternately and periodically along the length axis. In each uneven structure, the spatial frequency was 2000 lines/mm, and the depth of the depressions was 200 nm. The aspect ratio of the uneven structure in the second region was greater than the aspect ratio of the uneven structure in the first region.

The original plate was supported on the cylindrical surface of the plate cylinder of the gravure printing apparatus, and the applied film of the composition was radiated with ultraviolet rays directed from the opposite side of the transparent PET film from the applied film of the composition while the applied film was pressed onto the original plate. The ultraviolet curable resin in the composition was thus cured to form the upper transparent plastic layer. The pressure of the press was set to 2 kgf/cm$^2$, the press temperature was set to 80° C., and the press speed was set to 10 m/min. The ultraviolet rays were directed using a high-temperature mercury lamp with an intensity of 300 mJ/cm².

Then, an Al film, which was a metal film for forming reflective portions, was vacuum-deposited on the surface of the upper transparent plastic layer that had the uneven structure described above. The thickness of the Al film was set to 50 nm. Then, an $MgF_2$ film, which functioned as the mask layer for etching of the Al film, was vacuum-deposited on the surface of the Al film that was opposite to the surface in contact with the upper transparent plastic layer. The thickness of the $MgF_2$ film was set to 20 nm.

The Al film was then etched using a sodium hydroxide solution. After the etching, the sections of the Al film that were formed on the sections of the upper transparent plastic layer to which the first regions of the original plate were transferred remained on the upper transparent plastic layer. In contrast, the sections of the Al film that were formed on the sections of the upper transparent plastic layer to which the second regions of the original plate were transferred were selectively removed from the upper transparent plastic layer. A transmission diffraction portion that included reflective portions and transmissive portions and had a grating period of 10 μm was thus formed on the upper transparent plastic layer. In addition, protection portions, which overlap with the transmissive portions along the thickness axis, were also formed.

In reflected light observation of the resulted optical element, white light that was scattered by the non-periodic uneven structures of the reflective portions was observed. In transmitted light observation, transmitted light of vivid iridescent color, which resulted from diffraction by the wire-grid structure of reflective portions and transmissive portions arranged alternately and periodically, was observed.

Example 2

In Example 2, the first region of the original plate was different from the first region of the original plate in Example 1. The first region of the original plate of Example 2 included a plurality of depressions extending along the width axis and a plurality of projections extending along the width axis. The depressions and projections were arranged alternately along the length axis. That is, the first region had a diffraction structure, in which the spatial frequency was 1000 lines/mm, and the depth of the depressions was 100 nm.

In reflected light observation of the optical element formed using such an original plate, iridescent diffraction light, which was diffracted by the periodic uneven structures of the reflective portions, was observed. In transmitted light observation, transmitted light of vivid iridescent color, which resulted from diffraction by the wire-grid structure of reflective portions and transmissive portions arranged alternately and periodically, was observed. The diffraction light observed in the reflected light observation differed from the diffraction light observed in the transmitted light observation in diffraction grating period and thus in wavelength dispersion. As a result, the iridescent color of the light observed at the side of the upper transparent plastic layer opposite from the reflective portions was different from the iridescent color of the light observed at the side of protection portions opposite from the reflective portions.

Example 3

Example 3 differed from Example 1 in that the original plate included a first section, which corresponded to a first element portion, and a second section, which corresponded to a second element portion.

The original plate of Example 3 included the first and second sections. In the first section, rectangular first regions were arranged periodically along the width axis and arranged periodically along the length axis. The grating period along the width axis and the grating period along the length axis were 10 μm. In the second section, rectangular first regions were arranged irregularly. In the second section, second regions were located on the sections other than the sections where first regions were located. The sum of areas of first regions in the first section was equal to that in the second section.

In reflected light observation of the optical element formed using such an original plate, scattered light was observed in both of the two element portions, and thus the boundary between the two element portions was not perceived. In transmitted light observation, light of vivid iridescent color, which resulted from diffraction by the cross-grating structure of reflective portions and transmissive portions arranged alternately and periodically, was observed in one of the element portions. In the other element portion, white light transmitted through the non-periodic transmissive portions was observed.

The invention claimed is:
1. An optical element comprising a transmission diffraction portion, which includes
  a plurality of reflective portions arranged at equal intervals along a given axis, wherein each of the reflective portions reflects light included in visible light, and the light reflected by the reflective portions forms a reflection image, and
  a plurality of transmissive portions, each sandwiched by two corresponding reflective portions that are adjacent to each other along the given axis, wherein the transmissive portions transmit the visible light, wherein
  at least part of each reflective portion forms the reflection image by rendering a reflection angle of the light reflected by the reflective portions different from an angle of light incident on the reflective portions,
  the transmission diffraction portion forms a plurality of diffraction images having different colors with diffraction light that is produced by diffracting light transmitted through the transmissive portions in a predetermined direction,
  at least part of each reflective portion has a non-periodic uneven structure,
  the non-periodic uneven structure scatters visible light incident on the non-periodic uneven structure, and
  scattered light emanating from the non-periodic uneven structure forms the reflection image.
2. The optical element according to claim 1, comprising:
  a first element portion including the transmission diffraction portion; and
  a second element portion including a plurality of scattering portions, which scatters visible light, and a second transmissive portion, which occupies space between the scattering portions, wherein
  a ratio between a sum of areas of all the reflective portions and a sum of areas of sections in the first element portion that transmit the visible light is a first area ratio, a ratio between a sum of areas of all the scattering portions and an area of the second transmissive portion is a second area ratio, the first area ratio is equal to the second area ratio, and light that is transmitted by the second element portion differs from light that is transmitted by the first element portion.

3. An optical element comprising a transmission diffraction portion, which includes
   a plurality of reflective portions arranged at equal intervals along a given axis, wherein each of the reflective portions reflects light included in visible light, and the light reflected by the reflective portions forms a reflection image, and
   a plurality of transmissive portions, each sandwiched by two corresponding reflective portions that are adjacent to each other along the given axis, wherein the transmissive portions transmit the visible light, wherein
   at least part of each reflective portion forms the reflection image by rendering a reflection angle of the light reflected by the reflective portions different from an angle of light incident on the reflective portions,
   the transmission diffraction portion forms a plurality of diffraction images having different colors with diffraction light that is produced by diffracting light transmitted through the transmissive portions in a predetermined direction,
   at least part of each reflective portion has a periodic uneven structure having a predetermined periodicity,
   the periodic uneven structure diffracts visible light incident on the periodic uneven structure in a predetermined direction, and
   diffraction light emanating from the periodic uneven structure forms the reflection image.

4. The optical element according to claim 3, wherein
   a section having the periodic uneven structure is a first periodic section,
   each reflective portion further includes a second periodic section having an uneven structure that differs from the first periodic section in periodicity, and
   visible light incident on each reflective portion is diffracted by the first periodic section in a direction that differs from a direction in which the visible light is diffracted by the second periodic section.

5. The optical element according to claim 1, wherein
   the given axis is a first axis,
   at least part of each reflective portion has a semicylindrical surface extending along a second axis that intersects the first axis,
   the semicylindrical surface scatters visible light incident on the semicylindrical surface, and
   scattered light emanating from the semicylindrical surface forms the reflection image.

6. The optical element according to claim 5, comprising:
   a first element portion including the transmission diffraction portion; and
   a second element portion including a plurality of scattering portions, which scatters visible light, and a second transmissive portion, which occupies space between the scattering portions, wherein
   a ratio between a sum of areas of all the reflective portions and a sum of areas of sections in the first element portion that transmit the visible light is a first area ratio,
   a ratio between a sum of areas of all the scattering portions and an area of the second transmissive portion is a second area ratio,
   the first area ratio is equal to the second area ratio, and
   light that is transmitted by the second element portion differs from light that is transmitted by the first element portion.

7. The optical element according to claim 6, wherein the scattering portions are located irregularly in the second element portion.

8. The optical element according to claim 1, wherein
   each reflective portion and a corresponding one of the transmissive portions that is adjacent to the reflective portion along the given axis form one transmission periodic portion, and
   a width of the transmission periodic portion along the given axis is greater than 0.20 μm and less than 0.35 μm.

9. The optical element according to claim 1, wherein
   each reflective portion and a corresponding one of the transmissive portions that is adjacent to the reflective portion along the given axis form one transmission periodic portion, and
   a width of the transmission periodic portion along the given axis is between 0.35 μm and 20 μm inclusive.

10. The optical element according to claim 3, wherein
    each reflective portion includes depressions and projections that are arranged successively and alternately along a periodicity axis,
    each depression and a corresponding one of the projections that is adjacent to the depression along the periodicity axis form one reflection periodic portion, and
    a width of the reflection periodic portion along the periodicity axis is greater than 0.20 μm and less than 0.35 μm.

11. The optical element according to claim 3, wherein
    each reflective portion includes depressions and projections that are arranged successively and alternately along a periodicity axis,
    each depression and a corresponding one of the projections that is adjacent to the depression along the periodicity axis form one reflection periodic portion, and
    a width of the reflection periodic portion along the periodicity axis is between 0.35 μm and 20 μm inclusive.

12. The optical element according to claim 1, wherein
    the transmission diffraction portion is one of a plurality of transmission diffraction portions,
    in each of the transmission diffraction portions, each reflective portion and a corresponding one of the transmissive portions that is adjacent to the reflective portion along the given axis form one transmission periodic portion, and
    the transmission diffraction portions differ from one another in width of the transmission periodic portions along the given axis.

13. The optical element according to claim 1, wherein
    the transmission diffraction portion is one of a plurality of transmission diffraction portions, and
    the transmission diffraction portions differ from one another in the non-periodic uneven structure.

14. The optical element according to claim 3, wherein
    the transmission diffraction portion is one of a plurality of transmission diffraction portions,
    each reflective portion of each transmission diffraction portion includes depressions and projections arranged successively and alternately along a periodicity axis,
    each depression and a corresponding one of the projections that is adjacent to the depression along the periodicity axis form one reflection periodic portion, and the transmission diffraction portions differ from one another in width of the reflection periodic portions along the periodicity axis.

15. The optical element according to claim 1, further comprising a protection portion that covers each reflective portion, wherein
each reflective portion has a thickness of between 5 nm and 500 nm inclusive, and
each protection portion has a thickness of between 0.3 nm and 200 nm inclusive.

* * * * *